Jan. 4, 1938.　　　　C. W. GREEN　　　　2,104,588
CASH REGISTER
Filed Sept. 19, 1931　　　9 Sheets-Sheet 1

INVENTOR.
Charles W. Green
BY
ATTORNEYS.

Jan. 4, 1938.  C. W. GREEN  2,104,588
CASH REGISTER
Filed Sept. 19, 1931  9 Sheets-Sheet 2
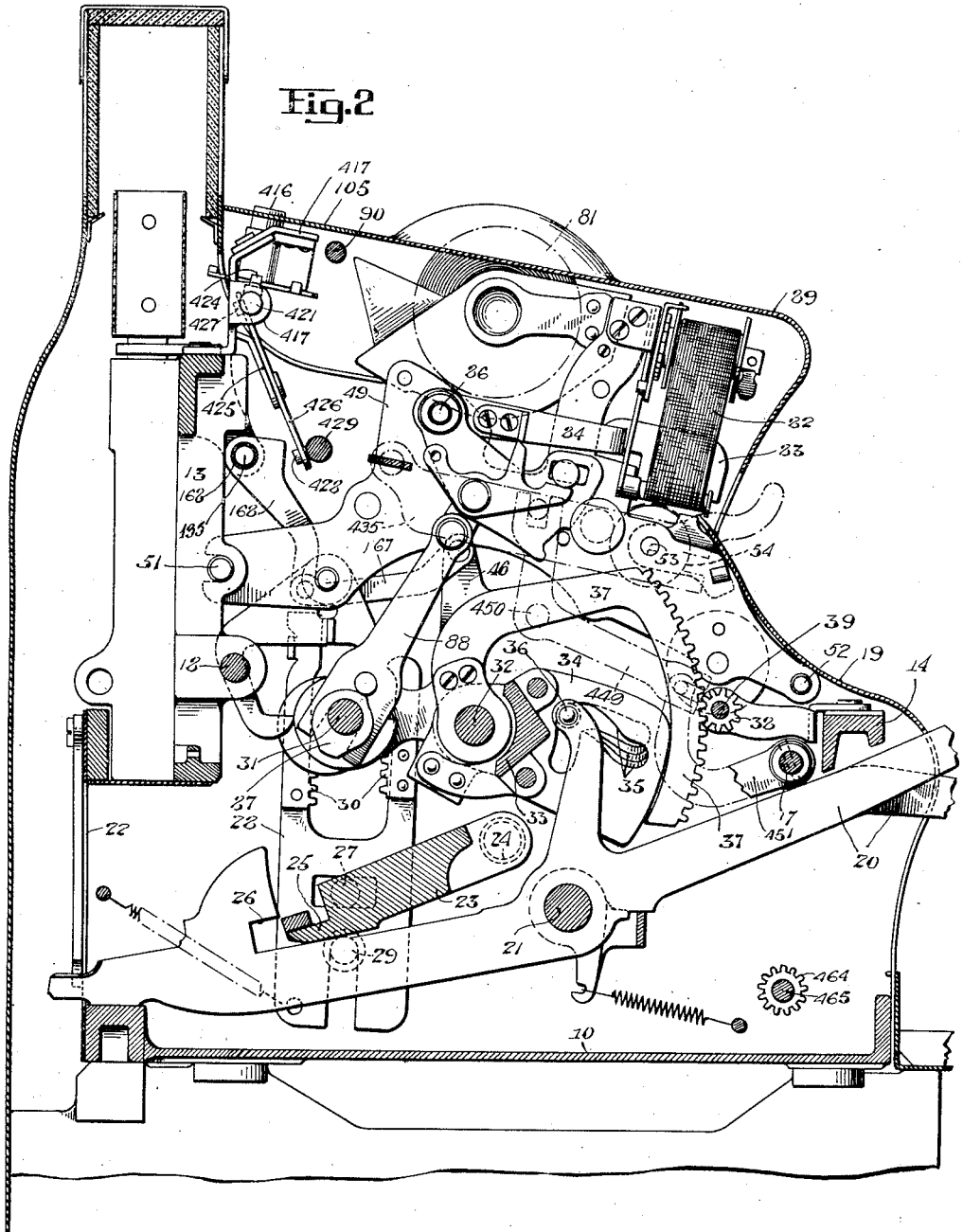
INVENTOR.
Charles W. Green
BY
ATTORNEYS.

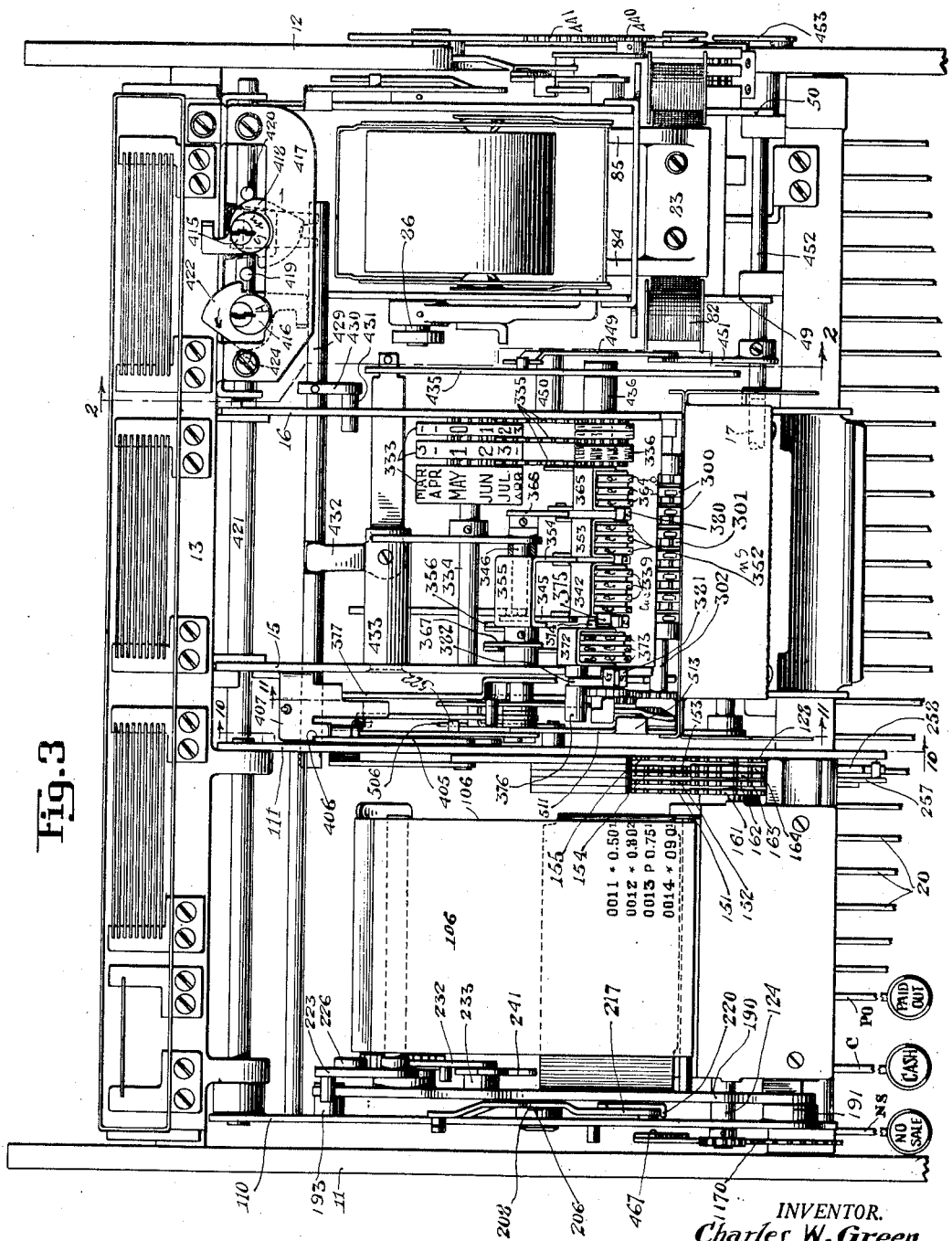

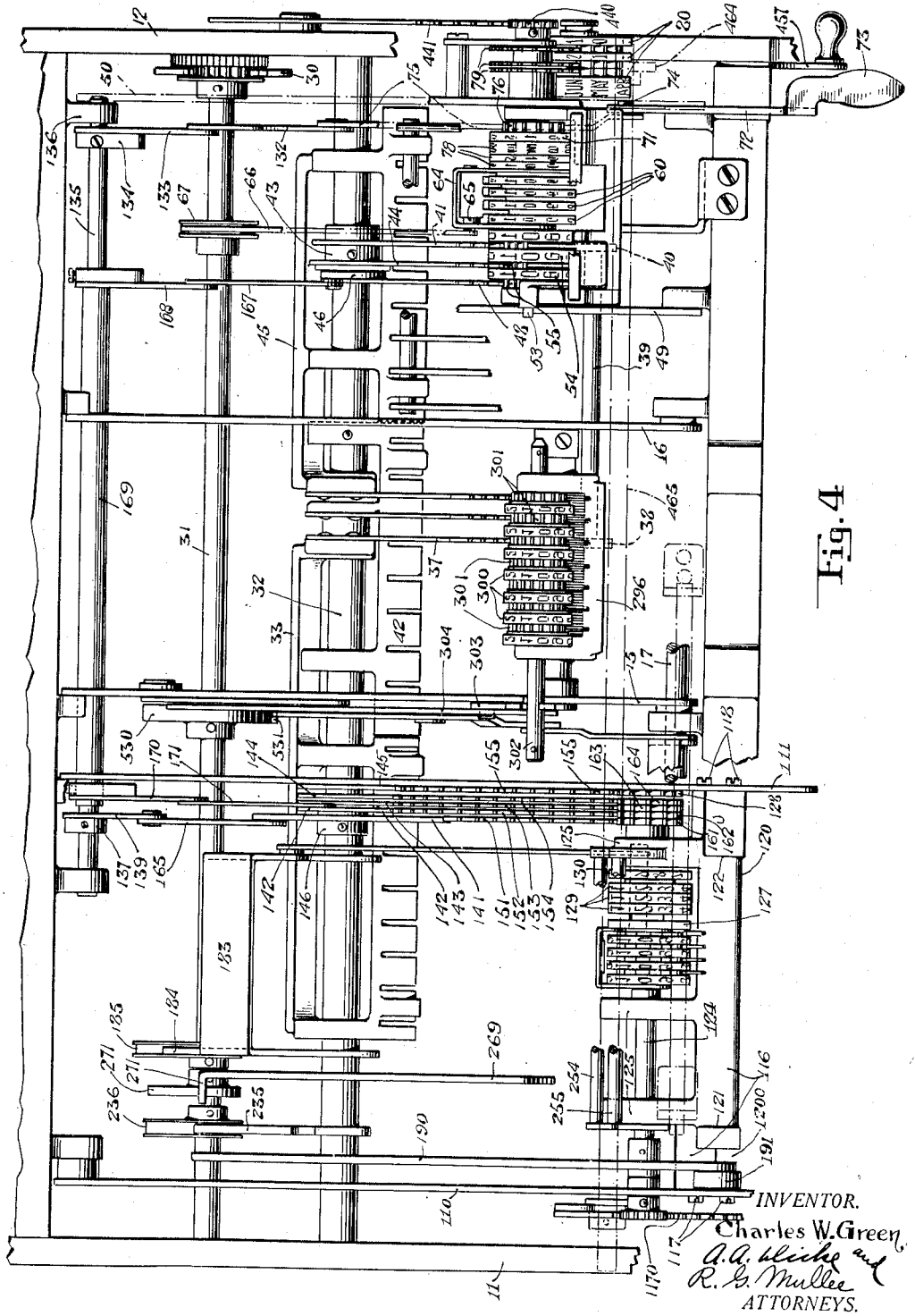

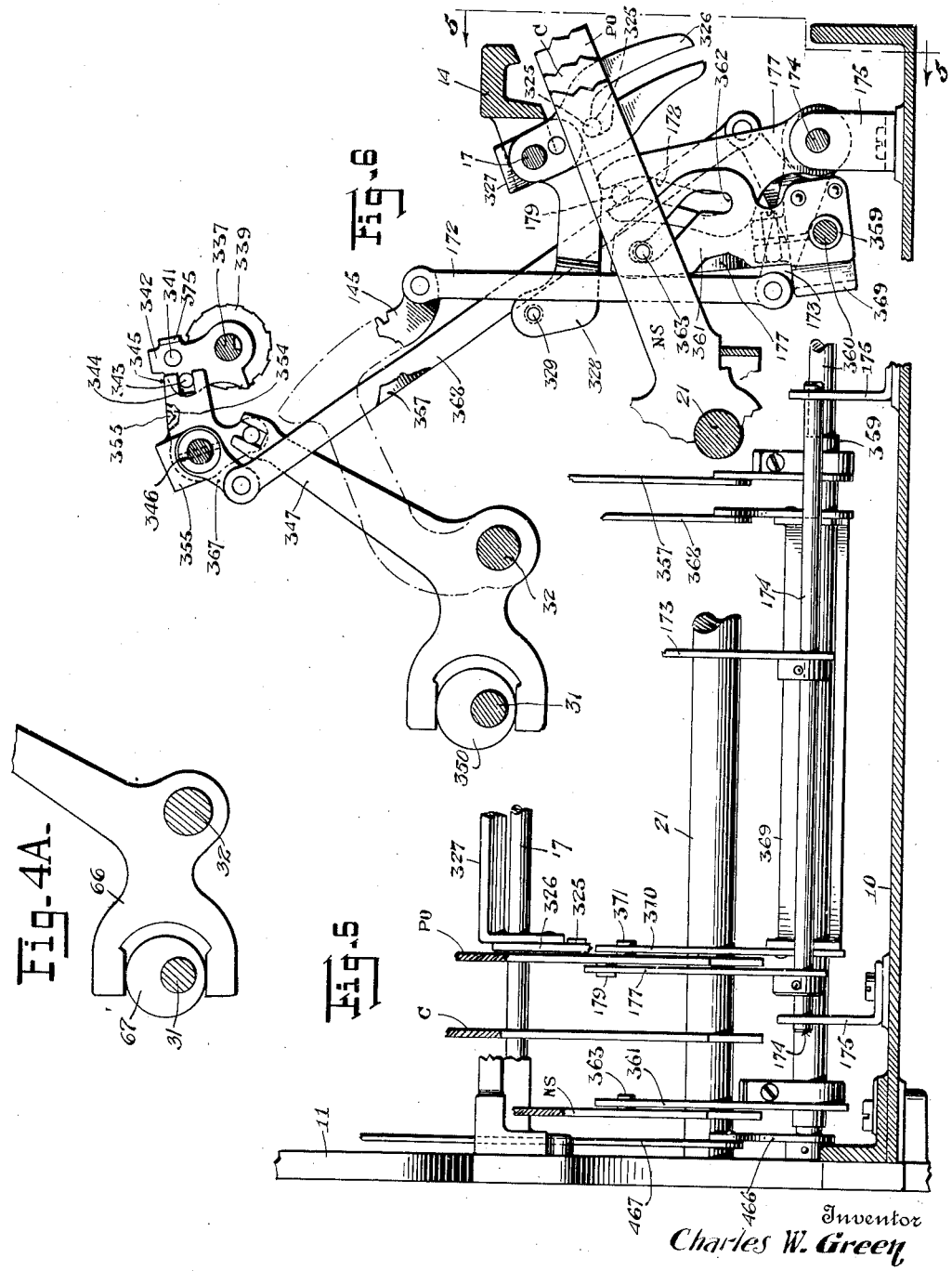

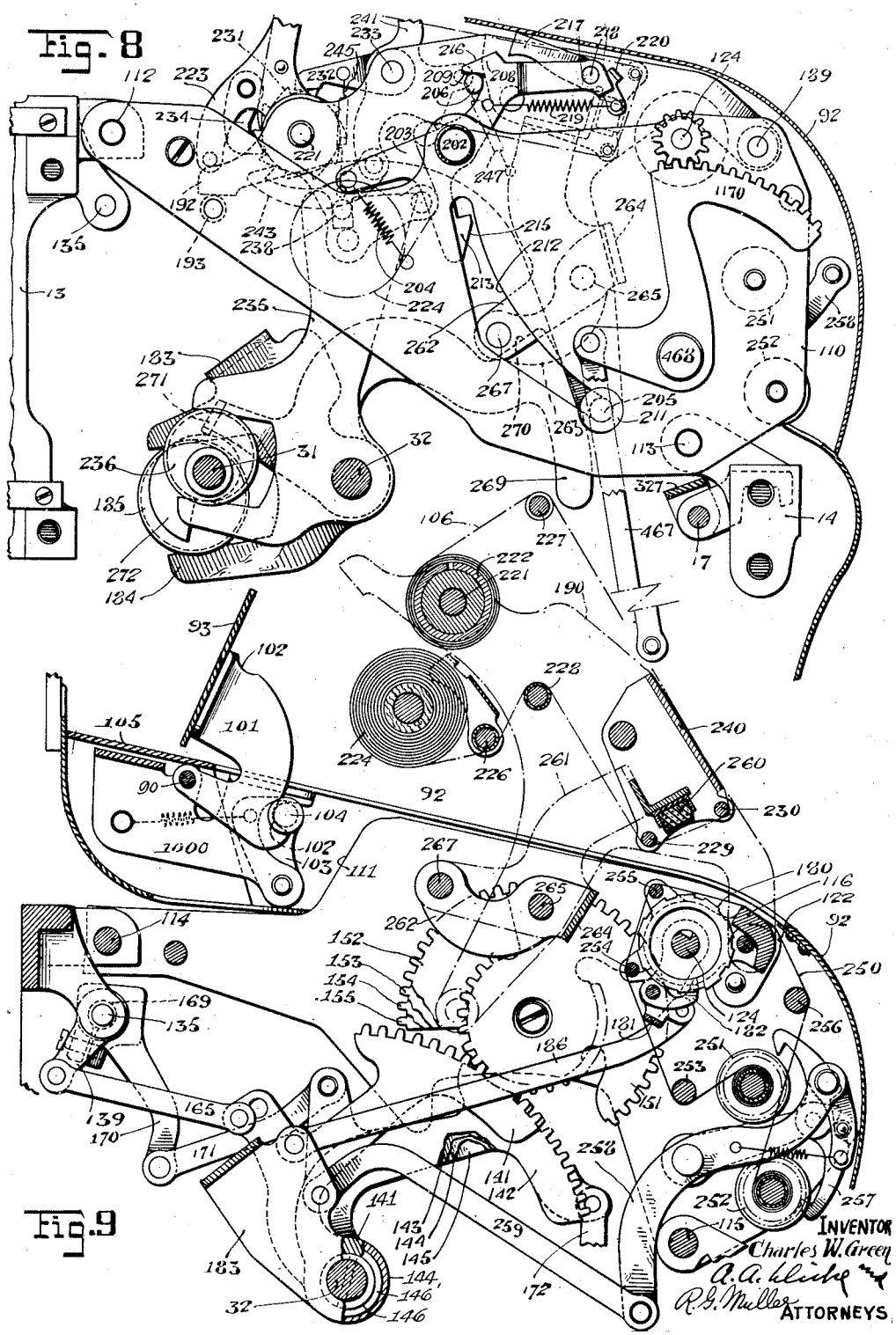

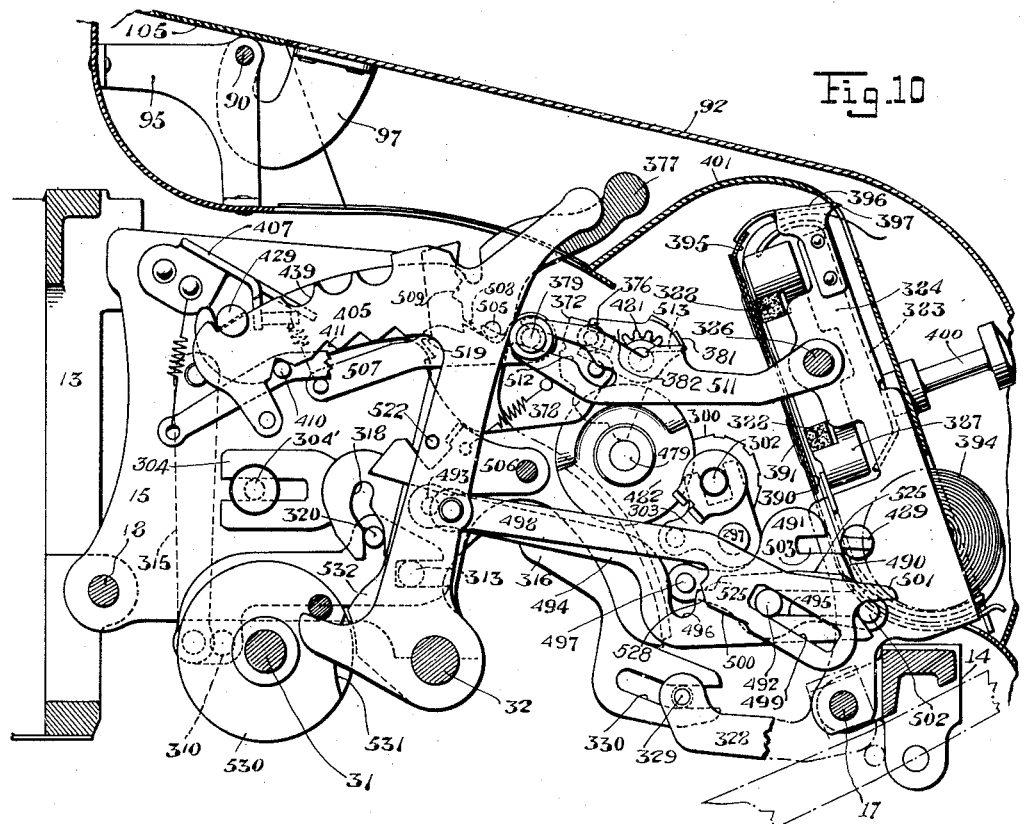
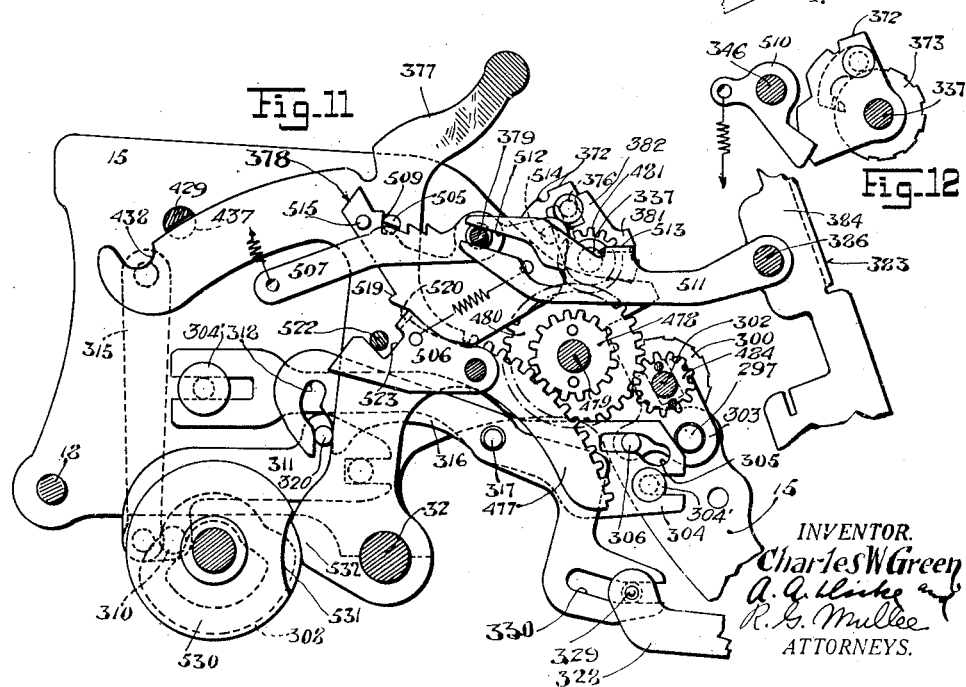

Jan. 4, 1938.   C. W. GREEN   2,104,588
CASH REGISTER
Filed Sept. 19, 1931    9 Sheets-Sheet 8
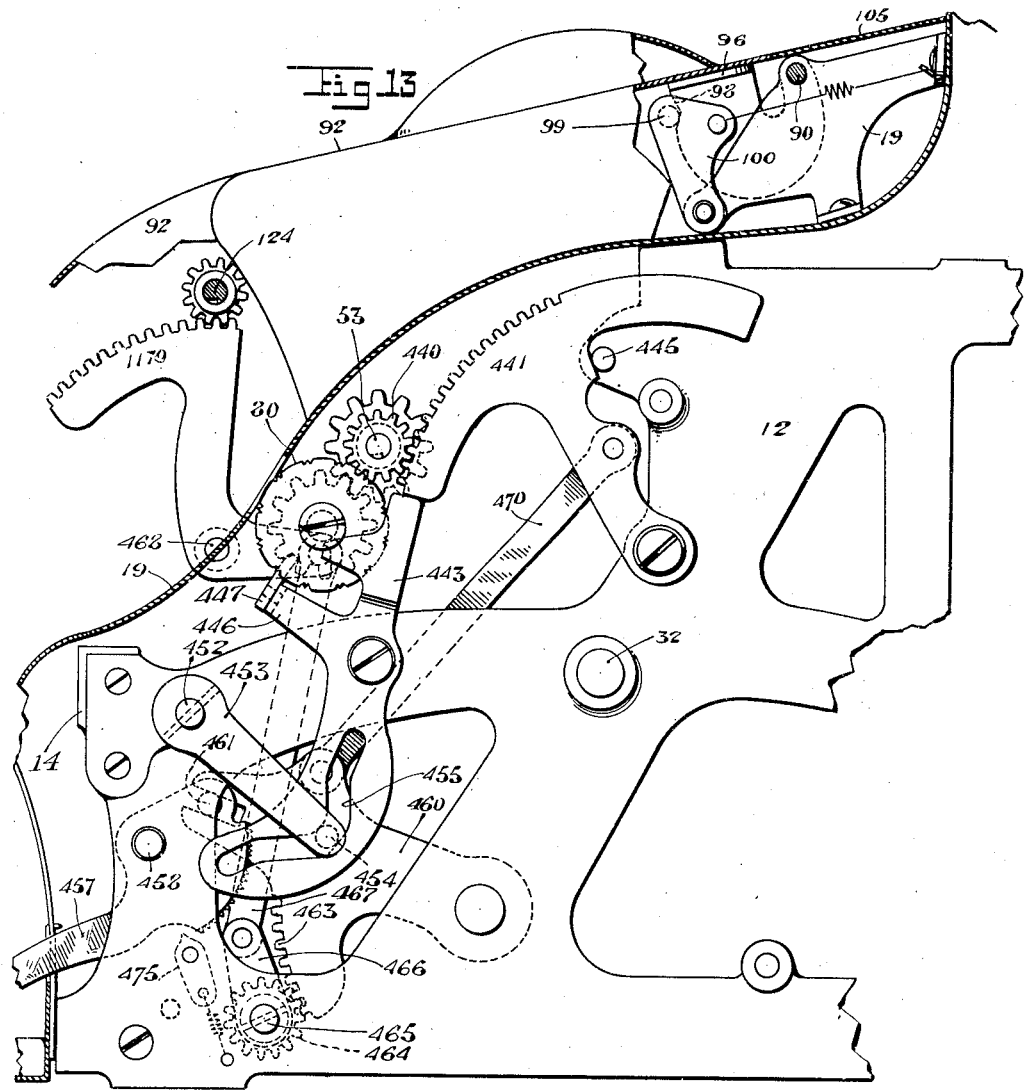
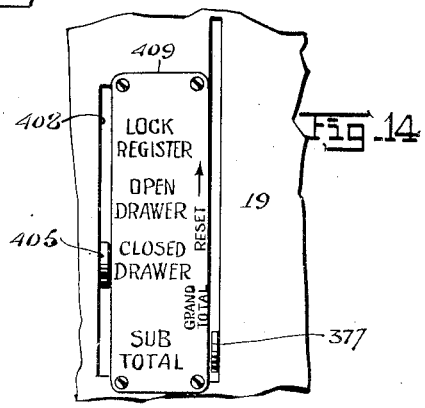
INVENTOR.
Charles W. Green
BY
ATTORNEYS.

Jan. 4, 1938.  C. W. GREEN  2,104,588
CASH REGISTER
Filed Sept. 19, 1931   9 Sheets-Sheet 9
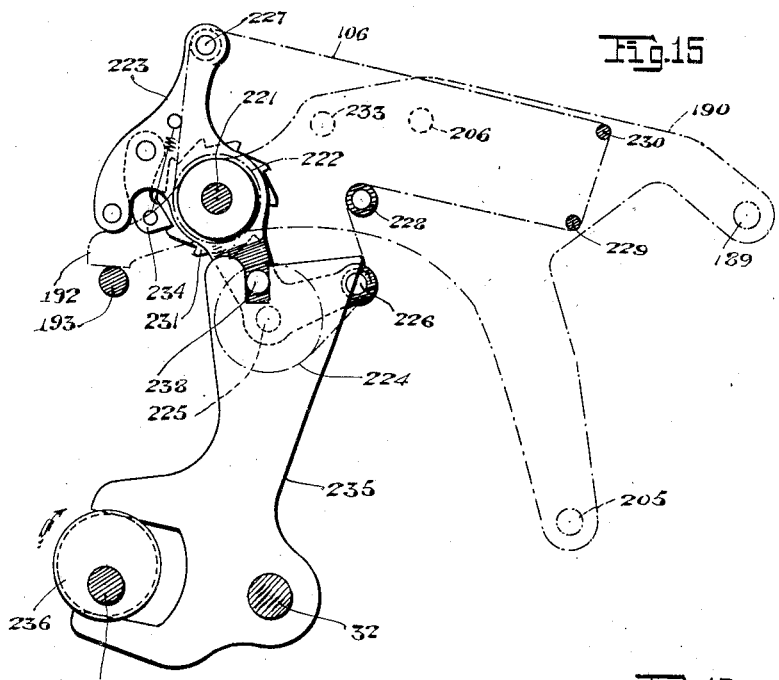
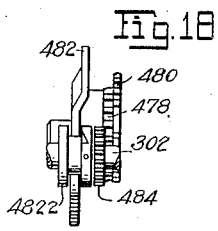
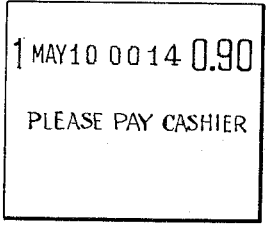
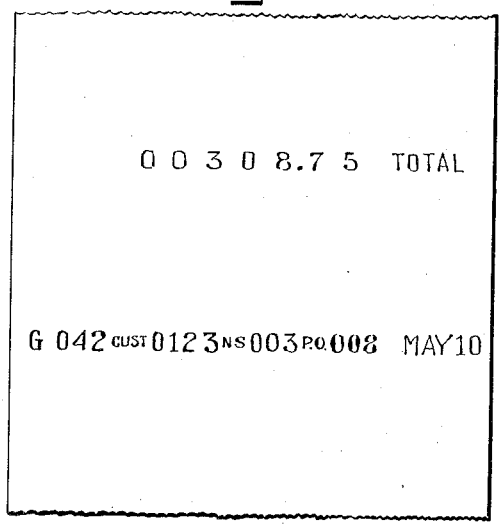
INVENTOR.
Charles W. Green
BY
ATTORNEYS.

Patented Jan. 4, 1938

2,104,588

UNITED STATES PATENT OFFICE 2,104,588

CASH REGISTER

Charles W. Green, Ilion, N. Y., assignor, by mesne assignments, to The National Cash Register Company, Dayton, Ohio, a corporation of Maryland Application September 19, 1931, Serial No. 563,757

21 Claims. (Cl. 235—130)

This invention relates to cash registers and more particularly to machines of the class described which are adapted to print records for auditing purposes, of various types of transactions, such as "cash", "paid out", and "no sale". An object of the invention, generally, is to insure the accuracy of the printed records available to a proprietor and an auditor by preventing accidental or intentional mis-operation of the machine.

One field in which the invention is particularly useful is in connection with chain stores, where the machine is operated by a clerk, who thereby makes a record of each transaction for the information of a store manager and an auditor. The machine is provided with a totalizer and various special counters, and the manager periodically—for example, once a day—obtains a printed record therefrom. Resetting of the totalizer and of certain of the special counters, however, is under the exclusive control of the auditor, who, at less frequent intervals, prints a "grand total" record.

The present invention embodies improvements upon the machine disclosed by applicant's copending application, Serial No. 13,470, filed March 6, 1925, and issued as Patent No. 1,873,760 on August 23, 1932. Like the machine of the prior application, the present machine is of the key operated type, wherein the operation of selected amount keys simultaneously advances the totalizer and one or more special counters referred to above. The prior application also discloses an arrangement for printing a running or sub-total, and for printing a grand total, by a store manager and an auditor, respectively. The present invention includes in addition, a check printer of the general type disclosed by the copending application of H. F. Sadgebury, filed September 25, 1926, Serial No. 137,664, and issued as Patent No. 1,957,671 on May 8, 1934.

More particularly, an object of this invention is to provide in a machine of the class described an itemized record of each transaction. This itemized record when used with the records previously referred to is especially useful in connection with "paid out" transactions. The itemized record is printed upon a strip of paper, referred to hereinafter as a "detail strip". At each operation of the machine an impression is made simultaneously upon the detail strip and on an issued check. The impression produced on the detail strip includes the amount of the transaction, a consecutive transaction number corresponding to the number on the check, and a mark identifying the nature of the transaction, such as "paid out", "cash" and "no sale". The consecutive transaction counter is adapted to be reset by the manager who may do so at the same time that he prints a sub-total. It will be seen, therefore, that by means of the consecutive numbers appearing on the detail strip the manager can ascertain which of the transactions listed thereon pertain to any particular day. The manager determines how much cash was received during the day by mentally substracting the sub-totals printed on two consecutive days. To determine the amount due to the store, he subtracts the amount paid out as indicated by the detail strip.

A further object of this invention is to provide a novel resetting means for the transaction counters associated with the check printer and detail strip printer respectively. Inasmuch as these counters have corresponding numbers it is desirable that they be reset by the same operation. A difficulty arises, however, in resetting two counters in different parts of the machine, because of the friction necessary to be overcome by the reset lever. If the two counters were reset at exactly the same time, the friction would be greatest near the end of the resetting stroke when all of the totalizer elements are being moved from "9" to "0". As a result, the manager might move the reset lever until the counter elements have all reached the "nine" position, and on finding opposition to the further movement of the lever, fail to complete the resetting operation in the belief that the lever has moved a full stroke. To prevent this, an arrangement is provided for distributing the force necessary to reset the two counters. Accordingly, the counters are so connected with each other and with the reset lever that upon the up-stroke of the lever, the check printer counter is restored to zero, while on the down-stroke, the counter for the detail strip printer is restored.

A still further object of this invention is to provide a detail strip printing mechanism which facilitates the insertion of the paper. In pursuance of this object, the paper supporting frame is pivoted at one end and adapted to be swung away from the platen when it is desired to replace the paper. A latch is provided to hold the paper supporting frame in either position.

A feature of this invention is a paper feeding device for the detail strip which places a minimum load on the keys. Such a paper feeding device is required in a key operated machine of the present type because of the many loads placed on the keys by the detail strip printer, check printer, totalizer and special counters. To this end, the invention contemplates an arrangement whereby most of the work in feeding the paper is done during the downstroke of the keys.

Still another object of this invention is to safeguard against improper resetting and total printing by the auditor. In accordance with this invention, the printer for taking totals is normally locked and is adapted to be released by either a manager's key or an auditor's key. A resetting lever, also normally locked, is released when the printer is unlocked by the auditor's key, but cannot be unlocked by the manager's key. A novel arrangement is provided which insures that, when the auditor prints a grand total, he is compelled to make a complete resetting operation before the machine is unlocked for further operation by the amount keys. Conversely, before the auditor may reset the totalizers, he is compelled to print a grand total. A suitable impression means is provided to identify the printed record as a grand total. Because of this arrangement it is impossible for a dishonest auditor to turn in a dubious total which is not immediately followed by a resetting operation. On the other hand, the auditor is protected against his own carelessness in attempting to reset the totalizer without first printing a grand total.

In accordance with the last mentioned object, an interlocking device is provided between the reset lever and the platen supporting frame. The frame may be unlocked by either the manager's or auditor's key to print a sub-total. The reset lever is normally locked against any movement whatsoever, but may be partially released by the auditor's key to permit the lever to move through a short distance without starting to reset any of the totalizer elements. Movement of the lever to this off-normal position replaces a sub-total printing character "S", in the path of the printing platen, by a grand total printing character "G". The reset lever cannot be moved either forwardly or backwardly until the platen is first moved to take a printing impression. After a grand total is printed, the machine remains locked in such a manner that the auditor cannot remove his key until he has first moved the reset lever backwardly and forwardly to reset completely the totalizer elements and certain special counters.

Another feature of this invention is an improved cabinet for a cash register. The cabinet has a hood for concealing certain printing devices, while permitting access to certain other devices under the hood by means of a door pivoted thereto. If the door is left open it will snap into closed position when the hood is subsequently raised and lowered.

With these and incidental objects in view, the invention consists in certain novel features of construction and combinations of parts, the essential elements of which are set forth in the appended claims and a preferred form of embodiment of which will now be described with reference to the drawings which accompany and form a part of the specification.

Of said drawings:

Fig. 2 is a sectional view taken substantially through the mid-portion of the machine and along the line 2—2 of Fig. 3, certain parts being omitted to show more particularly the differential devices, the platen operating mechanism and other details of the check printer.

Fig. 3 is a plan view of the machine with the cabinet removed, and shows the detail strip, the printer for the daily report sheet, and the check printer.

Fig. 4 is a plan view, certain parts being omitted to show more clearly some of the printing elements and the actuators therefor.

Fig. 4a is a detail view of the means for operating the consecutive counter actuating means.

Fig. 5 is a vertical section taken along the line 5—5 of Fig. 6 and showing the connections to the "no sale" and "paid out" keys.

Fig. 6 is a section taken near the left end of the machine looking toward the right. This view illustrates the connections between the keys in Fig. 5 and their respective counters.

Fig. 7 is an end view of the consecutive counter in the check printer, disclosing more particularly the resetting means therefor.

Fig. 8 is a side view of the itemizing printer for the detail strip, the printer being in operative position.

Figure 1:
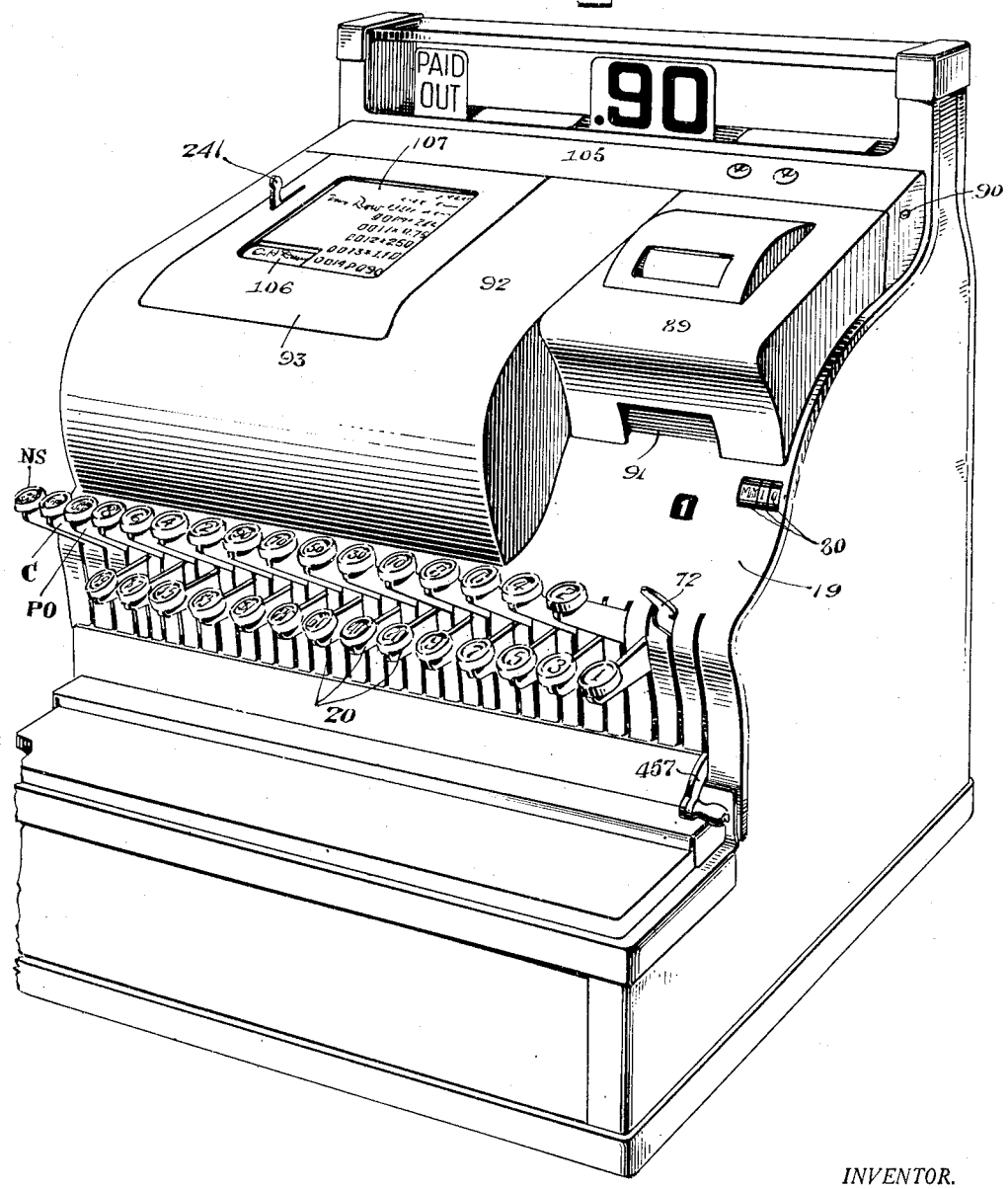
Fig. 1 is a perspective view of the illustrative machine, enclosed within a suitable cabinet.

Fig. 9 is a view of the itemizing printer, taken from the same side, certain parts being omitted to show more clearly the actuators for the item type wheels and customer's counter. In this figure the paper supporting frame is elevated to permit replacement of the paper. Fig. 9 shows also the support for the door overlying the detail strip.

Fig. 10 is a view taken along the line 10—10, Fig. 3, certain parts being omitted to more clearly show the daily report printer, the control lever, the reset lever, and various interlocking devices.

Fig. 11 is a view along the line 11—11, Fig. 3, certain parts being omitted to show more clearly the connections between the reset lever and the daily report printer. Figs. 10 and 11 also show an arrangement for preventing the accumulation of items when the "paid out" key is depressed.

Fig. 12 is a detail view of the reset counter associated with the daily report printer.

Fig. 13 is an end view on the right of the machine and showing the mechanism for unlocking the date wheels and for resetting the consecutive counters associated with the detail strip printer and check printer respectively. Fig. 13 shows also the support for the hood which conceals the daily report printer.

Fig. 14 is a plan view of the control lever and the reset lever.

Fig. 15 shows the paper feeding mechanism for the detail strip.

Fig. 16 is a specimen of an imprint made by an auditor with the daily report printer.

Fig. 17 is a specimen of an issued check.

Fig. 18 is a detail view showing parts of the resetting mechanism.

For convenience of description, the principal elements of the machine will first be enumerated, and their general purpose, arrangement and cooperation will be briefly explained in order to indicate the general operation of the machine as a whole, after which the preferred construction of these parts will be described more in detail together with their function and operation.

As shown in the drawings, the machine used to illustrate one embodiment of the invention is of the key-operated type of substantially the form disclosed in Patent No. 1,742,701, issued January 7, 1930, to Frederick L. Fuller. In this type of machine the various functions, such as, indicating, registering and recording, are effected directly by the operation of the keys. Addition of the present improvements does not materially affect the operation of such a machine in the performance of any of these functions but when the keys are operated additional type carriers forming a part of the new mechanism are adjusted to represent the keys depressed and impressions are then taken from the type carriers upon a check strip which is, during the time the keys are operated, fed out of the machine and severed from the rest of the check strip.

In the preferred embodiment, if the operator desires to print a character other than that represented by the normal position of a special type printing element, a setting lever is adjusted to its proper position and, by means of a special indicator, the position of the special type printing element may readily be ascertained. This special character may designate the number of customers participating in a particular sale. When the preliminary adjustment of the setting lever is completed, the operator merely depresses the proper amount keys in the usual way which results in feeding the check paper over the adjusted item type carriers, the special printing elements, as well as a series of consecutive numbering type carriers. Further operation of the machine causes the platen, which has been retracted in the meantime, to be released so that impressions are taken upon the check strip from all of the associated type carriers, as well as a fixed printing plate. During the first cycle of operation of the machine the operating devices for the consecutive numbering wheels are actuated so that a unit will be added to these wheels whereby the issued checks are serially or consecutively numbered. During the last part of the operation of the machine, the setting lever will also be returned to its normal position.

At substantially the same time that the check is printed upon and fed, the operation of the keys is effective to print upon and feed a detail strip. The detail strip forms a duplicate record of certain data printed upon the check, such as the number of customers indicated by the special type printing element, the amount of the transaction, and the consecutive transaction number.

With this general statement of the functions performed by the machine, a detailed description of the various parts for accomplishing those functions will now be given.

Framework

The various parts of the mechanism are supported by a suitable framework comprising a base casting 10 (Fig. 2) and parallel side frames 11 and 12 (Fig. 4). Extending between the rearward end of the frames 11 and 12 is a supporting frame 13 utilized to support the indicating and other mechanisms. The side frames 11 and 12 are rigidly connected together at their forward ends by a bar 14. Extending between the supporting frame 13 and the bar 14 and parallel to the frames 11 and 12 are intermediate frames 15 and 16, the front ends of which are bifurcated to engage a shaft 17 passing through ears integral with the bar 14. The upper rear ends of the intermediate frames 15 and 16 rest against the frame 13, while the lower rear ends of the frames 15 and 16 are apertured to receive a shaft 18 (Figs. 10 and 11) which passes through ears integral with the framework 13. The intermediate frames 15 and 16 are furthermore suitably joined together by means of shafts and connections which will be referred to hereinafter. As best shown in Fig. 1, the mechanism is enclosed in a cabinet 19 which may be made of any desired material. The cabinet 19 is slotted to receive the forward ends of a series of key levers and is furthermore apertured at its upper end to permit the viewing of the indicators. The mechanism for printing upon the daily report sheet and other associated mechanisms are concealed by a cover 401 (Fig. 10) which is rigidly attached to the cabinet 19 but which is suitably apertured so as to permit access to certain parts. In order to conceal and prevent unauthorized persons from having access to these printing devices, as well as various manipulative controls including a special printing control knob and a resetting lever, there is provided a cover or hood 92 hinged to the cabinet 19 and so arranged that when this cover is locked access cannot be had to any of the devices just mentioned. The cover 92 is sufficiently wide to overlie the detail strip printer, as well as the daily report printer, and is provided with a door 93 which may be opened by a clerk to permit replacement of the detail strip. Another cover 89 is provided to conceal and prevent access to the check printer.

Keys and key coupler

The amount keys 20 (Fig. 2) are loosely pivoted upon a key shaft 21 so that they may be moved through an angle about said shaft as a pivot. The amount keys 20 are guided in their movements at their forward ends by slots formed in the cabinet 19, and at their rearward ends by slots formed in a plate 22 which is attached to a portion of the framework. Resting upon the rear ends of the keys is a key coupler 23 provided with trunnions 24 by which it is pivoted, and with a flange 25 coacting with notches 26 formed in each of the operating keys. The key coupler serves in the usual way to insure simultaneous and uniform depression of the keys.

The key coupler is provided with a pin 27 extending through a horizontal slot in an upright double rack member 28. The rack has a slot at its lower end embracing a fixed pin 29 and is thus guided in its vertical movement by the pin but is rocked around the pin so that the sets of teeth 30 carried by the rack member 28 will alternately engage a pinion (not shown) attached to the driving shaft 31 of the machine. The shaft 31 is the main shaft of the machine and carries cams and other devices for operating certain mechanisms which will be described hereinafter. This arrangement of operating mechanism is similar to that shown in Patent No. 1,742,701, to Frederick L. Fuller, hereinbefore referred to.

Differential mechanism

The differential mechanisms or devices controlled by each of the various banks of keys for adjusting type carriers are all similar in construction and principle and the description of these devices will, therefore, be confined to that associated with the dollars bank of keys.

Loosely mounted upon a transverse shaft 32 is a frame 33 provided with spaced slots in which are inserted and secured a series of cam plates 34. The cam plates 34 are provided with differentially inclined slots 35, the slot in each cam plate being correlated with a roller 36 carried by an upstanding arm of the adjacent operating key 20. From the foregoing it will be evident that upon the depression of an amount key a differential movement will be imparted to the frame 33 and to the connected devices which will now be described.

In the illustrative machine the differential devices besides having other functions are utilized to adjust a plurality of type carriers for printing the amounts upon an issued check. To this end the differential frame 33 has connected thereto a segmental rack 37 which meshes with a pinion 38 (Figs. 2 and 4) attached to a transverse shaft 39. The other end of the shaft carries a pinion 40 which meshes with a segment 41 similar to the segment 37 and loose on the shaft 32.

For connecting the dimes differential frame 42 to the corresponding item type wheel in the check printer the former is rigidly secured to the shaft 32 which in turn is fastened to a sleeve 43 (Fig. 4). Secured to the sleeve 43 is a segmental gear 44 for actuating the dimes type wheel.

The differential frame 45 corresponding to cents is provided with an upstanding lug 46 (Fig. 4) to which is secured a segment 48 loosely pivoted upon the shaft 32 and adapted to actuate the units wheel of the check printer.

Check printer

The mechanism for taking impressions upon and issuing the checks may be any one of several well known types. One form of printer suitable for the purpose is described in the above referred to Patent No. 1,957,671, issued to H. F. Sadgebury. Only so much of the printer will be described herein as is necessary to understand the invention.

The devices for printing and issuing checks are, in the main, carried by two side frames 49 (Figs. 2, 3, and 4) and 50 (Fig. 3). The side frames are connected together in spaced relation by shafts and cross members so that most of the elements comprising the check printing devices may be carried by said framework. The framework is supported at its rear end by a transverse pin 51 (Fig. 2) and at its forward end by a pin 52, both of which pass through ears integral with the machine framework 13 and 14, respectively. By reason of this construction, the printing unit as a whole may be readily detached from the machine for the purpose of inspection, adjustment, etc.

The frames 49 and 50 carry a shaft 53 (Fig. 2) which is the supporting shaft for the item type carriers 54. Each of the item type carriers 54 is provided with a pinion 55 (Fig. 4) meshing with the teeth of its associated rack 41, 44 or 48, so that by the connections just described the differential devices may adjust the associated type carriers to positions determined by the keys depressed.

Check printer—consecutive counter

It is considered desirable to consecutively number the checks issued from the machine and to carry out this result the illustrative machine is provided with a series of consecutive number printing wheels to which a unit is added during each operation of the machine.

The consecutive numbering counter is of the multiple pawl, deep notch transfer type, well known in the art and described in many patents, one of which is the patent to Carney, No. 876,295, dated January 7, 1908. The consecutive numbering wheels 60 (Fig. 4) are formed with printing characters and are loosely mounted upon the shaft 53.

The consecutive counter wheels are actuated in a manner well known in the art, by the bail 64 loosely mounted upon the shaft 53. The bail 64 has attached thereto a pin 65 cooperating with an arm 66 which is loosely mounted upon the shaft 32. The arm 66 at its rearward end is bifurcated to cooperate with an eccentrically mounted disk 67 securely attached to the driving shaft 31. From the above it will readily be understood that for each operation of the machine, whether for a "cash", "paid out", or "no sale" transaction, the driving shaft 31 and cam disk 67 will make a complete revolution, thereby rocking arm 66 and bail 64 to add a unit to the consecutive counter of the check printer.

While the type carriers which have already been described, comprising three item printing wheels and a series of consecutive numbering wheels, ordinarily furnish sufficient information upon the issued checks, it is considered desirable in some types of business to print other identifying characters upon the checks. These characters have a particular significance, depending upon the type of business in which the machine is used.

In alignment with the item type carriers and consecutive numbering type carriers, for this purpose, is a special type carrier 71 (Fig. 4) which is normally in a position to print the digit "1" on the upper left hand corner of the checks, as shown in Fig. 17. As will be described hereinafter, any other digit in place of "1" may be printed by properly setting a lever.

Due to the fact that any desired characters may be printed by the special type carrier 71, considerable flexibility is afforded so that this device may be used advantageously in different businesses. In classes of business dispensing food and drinks, for example, this digit will tell the cashier the number of people in the party to be paid for on a single check. In theatres and dance-halls the digit shows the number of people to admit on one check. At barber shops it may be utilized to indicate which barber gets credit for the transaction, and in some mercantile establishments it may be used to identify the clerk, or show the number of parcels wrapped to be given to the customer on the single check.

In order to set the type carrier 71 to the desired position, there is loosely mounted upon the shaft 21 a setting lever 72 (Figs. 1 and 4) which projects through the machine cabinet 19 and plays in a slot formed therein. By means of a bent portion 73 the lever may be rocked about its pivot to any desired position. The setting lever 72 has a longitudinally extending slot (not shown) which cooperates with a stud 74 fixed to a gear segment 75 which meshes at all times with a pinion 76 attached to the type wheel 71. The connections between the lever 72 and the type wheel 71 just described are shown in more detail in the above referred to patent of H. F. Sadgebury, No. 1,957,671.

It is also desirable to print the date of the transaction upon the issued check. To this end, there are loosely mounted upon the shaft 53, three date wheels 78 for printing months, tens and units, respectively. The three date wheels are connected respectively by three sleeves loosely mounted upon the shaft 53 and concentric therewith to three spur gears 79. The spur gears mesh with pinions secured to manipulative wheels 80. As shown in Fig. 13 the wheels 80 project partially through the outer cabinet 19, whereby the wheels may be independently set by hand. There is provided an arrangement for unlocking and locking the date setting wheels 80 under the control of a manager's key or an auditor's key. This locking arrangement is controlled by a device which also controls the resetting of the consecutive counters. For this reason the locking means for the date wheels will be described subsequenly in connection with the consecutive counter resetting device.

The check paper is carried by a supply roll 81 (Fig. 2) and is fed over the inking ribbon 82 which overlies the type wheels. The mechanism for feeding the paper may be any one of many well known types, but is preferably of the type disclosed in the above-mentioned Patent No. 1,957,671, issued to H. F. Sadgebury.

The platen for printing impressions upon the check comprises a cross member 83 (Fig. 3) integral with which are two rearwardly extending arms 84 and 85, the arms being pivoted to a shaft 86 (Fig. 2) extending between the frames 49 and 50. The cross member 83 is preferably provided at its under side with a rubber impression block (not shown) which is of sufficient size to overlie all the printing elements. The platen is adapted to be elevated and then retracted by a spring (not shown) connected to the arm 85 so as to produce a printing impression on the paper during each operation of the machine. The mechanism for operating the platen to print upon the check is actuated by the cam disk 87 on the main shaft 31, acting through the arm 88 and a series of levers to lift the platen and then permit it to drop every time the machine is operated. This platen operating mechanism which does not form part of the present invention, will not be described in detail herein, inasmuch as such description is deemed unnecessary. For a complete disclosure reference is made to the Sadgebury Patent No. 1,957,671.

In order to conceal the check printing devices a cover 89 (Fig. 1) is provided, the cover being pivotally supported at its rear end by a rod 90 which extends across the machine above the cabinet 19. The cover 89 is provided with a window to permit visibility of the check paper, and with an opening 91 through which the checks are issued.

From the above description, it will be seen that every time a key or a combination of keys is depressed a check will be issued, recording the special character selected by the lever 72, the date, the consecutive transaction number, and the amount of the sale.

It is desirable to keep a printed record of certain items appearing on the checks. To this end, there is provided a detail strip printer which is so connected to the check printer that whenever a consecutive number, an amount and a special character are printed upon a check, the same data will be duplicated upon a record strip.

*Hood for detail strip and daily report printers*

The detail strip printer and daily report printer, both of which will be described hereinafter, are disposed underneath a hood 92 (Fig. 1) which is normally locked to prevent access to the printing mechanisms and certain associated manipulative devices. The hood 92 is provided with a door 93 which overlies the detail strip and which may be lifted at any time to permit inspection and replacement of the paper.

It is desirable that the door 93 be opened by the manager or auditor in order to inspect the detail strip just before the hood 92 is lifted to permit printing upon the daily report sheet. In order to facilitate the manipulation of the door 93 and further to prevent possible damage to the machine, a novel arrangement is provided which automatically closes the door when the hood 92 is opened and subsequently closed.

The hood 92 is pivoted at its rear end to the rod 90 which, it will be remembered, also serves as the pivotal support for the check printer cover 89. The rod 90 is supported by brackets 19 (Fig. 13) and 95 (Fig. 10) fixed to the cabinet 19. A pair of movable brackets 96 and 97 are riveted or otherwise secured to the hood 92 and are apertured to receive the shaft 90. One of the movable brackets 96 is provided with a notch 98 for receiving a pin 99 mounted upon a spring pressed pawl 100 pivoted to the fixed bracket 19. The remaining portion of the outer edge of the movable bracket 96 is curved eccentrically with respect to the supporting rod 90. By reason of the above described construction, when the hood 92 is elevated, the pin 99 frictionally engages the eccentric edge of the movable bracket 96 to hold the hood against downward movement. On the other hand, if the hood is near its normal or closed position, the pin 99 rides into the notch 98 thereby camming the bracket 96 downwardly and causing the hood to snap into a completely closed position.

The door 93 is pivoted to the rod 90 by two supports disposed at the rear edge of the door, one pivotal support being shown in Fig. 9. This support comprises a movable bracket 101 secured to the door 93 and pivoted on the rod 90, and provided with two notches 102 for yieldingly locking the door in either of its extreme positions. A spring pressed pawl 103 pivoted on a bracket 1000 secured to the hood 92 is provided with a detent 104 which cooperates with the notches 102. From the above description, it will be seen that if the hood 92 is in its normal position the spring pressed detent 104 will cooperate with one or the other of the notches 102, thereby yieldingly locking the door 93 in either an elevated or a normal position.

Assuming that the parts are in the position shown in Fig. 9, if the manager or auditor raises the hood 92 without first closing the door 93, the hood rocks upwardly about the pivot 90 carrying with it the bracket 1000 and pawl 103. Due to the engagement of the detent 104 with the lower notch 102, the door 93 is carried with the hood for a short distance until the rear edge of the door engages a fixed plate 105 secured to the cabinet 19. The door is thereby prevented from moving further, and thereafter the detent 104 rides along the cylindrical surface of bracket 101 until the detent 104 snaps into the upper notch 102. When the hood 92 is subsequently lowered, the bracket 1000, pawl 103 and detent 104 move downwardly with the hood, the frictional engagement between the detent 104 and the notch 102 being of sufficient force to lower the door 93 at the same time. The hood and door are thereby restored to the normal position shown in Fig. 1.

*Detail strip printer*

The printer for the detail strip may be located near the left end of the machine as shown clearly in Figs. 1, 3, and 4. Referring to Fig. 1, the detail strip 106 is situated beneath a window provided in the door 93 in the hood 92. The strip is so arranged that an itemized record of several consecutive transactions is visible to the clerk at the same time, the last transaction (amounting to 90 cents) appearing upon the bottom line. As the machine is operated the paper strip is fed upwardly step-by-step. The window comprises a glass 107 cut away at its lower left hand end to permit the clerk to write on the paper adjacent the printed amount.

The detail strip printer is supported by two vertical plates 110 and 111. The plates 110 and 111 are rigidly supported in spaced parallel relation by the rear frame 13 and front frame 14. The left hand plate 110 is secured to the frames 13 and 14 by suitable fastening means 112 and 113, respectively, (Fig. 8). The right hand plate 111 is secured to the frames 13 and 14 by fastening means 114 and 115 (Fig. 9). Separating the printer supporting plates 110 and 111 at their front end is a casting 116 (Fig. 4) abutting the plates at its respective ends and secured thereto by screws or the like 117 and 118, respectively. The casting 116 is cut away at 1200 near its left end for a purpose to be later explained. The intermediate portion of the casting 116 has a rounded edge 120 (Figs. 4 and 9) limited by two shoulders 121 and 122 for receiving the inking ribbon, as will be pointed out more clearly hereinafter.

The type wheel supporting shaft 124 in the detail strip printer is loosely journalled in three spaced lugs 125 provided on the casting 116 for receiving said shaft. The shaft projects at its left end through the fixed supporting plate 110. The shaft 124 supports a set of item wheels for printing the amount of each transaction; counter wheels for printing the consecutive number of transactions since the last resetting operation; and a type wheel, positioned by the aforementioned lever 72, for printing the number of customers participating in a particular sale. All of these sets of type wheels are connected to move in unison with corresponding type wheels in the check printer. In addition, the shaft 124 supports a special type wheel for designating the nature of the transaction whereby to distinguish between a "cash" and a "paid out" transaction.

All of the type wheels, except those constituting the consecutive counter, are connected by a plurality of concentric sleeves to corresponding spur gears meshing with segments by means of which the type wheels may be actuated. The type wheel 127 (Fig. 4) for distinguishing "paid out" from "cash" transactions is connected, by a sleeve (not shown) surrounding the shaft 124 to the spur gear 128. In a similar manner, the amount wheels 129 and the customer wheel 130 are individually connected by concentric sleeves to their respective spur gears.

The movements of the customers' lever 72 are transmitted to the type wheel 130 at the same time that the corresponding type wheel 71 in the check printer is actuated. The actuating segment 75 for the type wheel 71 is connected by a link 132 to an arm 133 attached to a collar 134 (Fig. 4). The collar 134 is secured to a shaft 135 mounted in bearings 136 attached to the rear frame 13. At the other end of the shaft 135 is secured a collar 137 having an arm 139. Referring now to Fig. 9, a plurality of actuating segments 141 to 145, inclusive, are mounted upon the shaft 32. A sleeve 146 is secured to the same shaft. The segments 141 and 142 are loosely mounted upon the sleeve 146, while the segments 144 and 145 are loosely mounted upon the shaft 32. The segment 143 is attached to the sleeve 146 by any suitable arrangement which may comprise a flange 146 on the sleeve. Meshing respectively with these gears is a set of intermediate segments 151 to 155, inclusive, which also mesh with spur gears 161, 162, 163, 164, and 128, respectively, (Fig. 4) the latter being attached to sleeves concentric with the type wheel shaft 124 as above described. Figure 9 shows the segment 141 and its corresponding intermediate segment 151 in moved position. The actuating segment 141 is connected by a link 165 to the arm 139 attached to the shaft 135.

From the above it will be seen that, whenever the lever 72 is set to print a number on the check strip and detail strip, movement of the lever is transmitted to the detail strip printer through the check printer actuating segment 75 (Fig. 4), link 132, arm 133, sleeve 134, shaft 135, sleeve 138, arm 139 (Fig. 9), link 165, actuating segment 141, intermediate gear 151, spur gear 161, a sleeve (not shown), and type wheel 130. Thus, it is evident that the type wheel 130 in the detail strip printer is connected to move in unison with the corresponding type wheel 71 in the check printer.

Similarly, the units wheel of the type wheels 129, for printing amounts upon the detail strip, is connected to move with the corresponding wheel in the check printer. The operating means for the former comprises a link 167 (Fig. 4) pinned to the upstanding arm 46 (Fig. 2) on the cents differential frame 45, an arm 168, sleeve 169 fixed thereto, arm 170 (Fig. 9), link 171, actuating segment 142, intermediate gear 152, spur gear 162, sleeve (not shown), and units wheel 129.

The actuating segment 143 for the dimes type wheel 129 receives its movements from the dimes differential frame by means of the sleeve 146 (Fig. 4) fixed to the shaft 32, which in turn is secured to the frame 33.

The actuating segment 144 for the dollars type wheel 129 is fixed directly and by any suitable means to the dollars differential frame 33.

The actuating segment 145 for the special printing element 127 has pivoted thereto a depending link 172 (Fig. 6) pivoted at its lower end to an arm 173 fastened to a shaft 174. The shaft 174 is adapted to be rocked away from its normal position whenever the "paid out" key is depressed.

Referring to Figs. 5 and 6 the shaft 174 is supported by brackets 175 fixed to the machine base 10. Secured to the shaft 174 is an arm 177 having a cam slot 178 for receiving a pin 179 on the "paid out" key PO.

The printing element 127 (Fig. 4) is normally in a position to print a star (*) on the detail strip which identifies the transaction as a cash sale. If, however, the "paid out" key PO is depressed, this key will rock the slotted arm 177, shaft 174 and arm 173. The link 172 transmits the motion to the actuating segment 145 which in turn moves the type wheel 127 for a part of a revolution, whereby the type wheel is adapted to print the symbol "P" indicative of a "paid out" transaction (see Fig. 3).

The consecutive counter wheels 180 are similar in construction and purpose to the corresponding counter wheels 60 in the check printer. A bail 181, pivoted to rock about the shaft 124, carries a pawl 182 (Fig. 9) for advancing the units wheel of the counter each time that the bail is rocked back and forth. Loosely mounted upon the shaft 32 is a bail 183 (Figs. 4, 8, and 9) having at its left end two parallel rearwardly extending arms 184 which engage with the top and bottom respectively of a disk 185 mounted eccentrically upon the main driving shaft 31 and secured thereto. A link 186 connects the bail 183 with the bail 181. During each operation of the machine the main driving shaft 31 and the eccentric disk 185 make a complete rotation, thereby rocking the bail 183 first upwardly and then downwardly. By means of the link 186, the bail 181 and pawl 182 are rocked rearwardly and then forwardly to cause the pawl to engage a ratchet attached to the units wheel, whereby the consecutive counter is advanced one step.

It has been shown that the customers' type wheel 130, amount type wheels 129 and consecutive counter wheels 180 in the detail strip printer always register the same amounts as the corresponding type wheels 71, 54, and 60, respectively, in the check printer. This arrangement is particularly desirable in stores which have a clerk for issuing checks and a cashier for receiving the checks and the amount printed thereon. The checks may be counted at the end of the day and if any checks that were issued have not been turned in, the missing checks can be identified by matching the remaining checks with the detail strip. By referring to the handwriting on the detail strip, the absence of the checks may be accounted for.

Supporting frame for detail strip

The paper 106 is carried by a supporting plate 190 (Figs. 3, 4, 8, 9, and 15) pivoted at its forward end to the fixed supporting plate 110, the pivot 189 being aligned within the notch 1200 cut in the casting 116 and being surrounded by a spacing stud 191. By means of the pivotal connection the frame is adapted to be disposed in either one of two positions. Figs. 8 and 15 show the plate 190 in its downward home position with the rearwardly extending toe 192 resting on a stud 193 fastened to the fixed plate 110. This is the normal position wherein the detail strip 106 is adapted to be printed upon during each operation of the machine. The paper supporting plate 190 may be swung upwardly to the Fig. 9 position when it is desired to replace the paper. To accomplish this the door 93 is first lifted, whereby the pivoted plate 190 is made accessible.

Pivotally mounted upon the fixed plate 110 at 202 (Fig. 8) is a three-armed lever 203, two of whose arms are hook-shaped. The function of the double hook lever 203 is to lock the pivoted plate 190 in the upper and in the lower position. The double hook is provided with a spring 204 urging the former in a counter-clockwise direction, as seen in Fig. 8. The pivoted plate 190 has two studs 205 and 206 (Figs. 8 and 15) attached thereto which cooperate with the double hook 203 to lock the plate either up or down. Normally the stud 206 is disposed under the hook 208 on the three-armed lever 203. The hook 208 has an engaging surface 209 which will prevent the stud from rising should an attempt be made to lift the stud 206 with the plate 190.

The stud 205 projects through an arcuate slot 212 in the fixed plate 110 and has a flange 211 overlapping the outer side of plate 110 to prevent lateral movement of the pivoted plate 190. The narrow portion of the stud 205 cooperates with the lower hook 213 which is shaped similarly to hook 208 and which holds the pivoted plate 190 in the elevated position.

It will be clear that the studs 205 and 206 cannot be moved out of locking relation with their respective hooks 213 and 208 without rocking the double hook 203 clockwise against the pressure of spring 204. On the other hand the studs can readily be moved into locking relation by the cooperation of the studs with the inclined surfaces 215 and 216 on the backs of the respective hooks.

For moving the double hook clockwise to unlock the plate 190, a manipulative lever 217 (Fig. 8) is pivoted at 218 to the hook lever 203 and is urged by a light spring 219 to occupy a vertical position when the door 93 is lifted. Forward movement of lever 217 with respect to lever 203 is limited by a flange 220 integral with the former. When the lever 217 is pulled forward, it will rock the hook lever 203 to release one of the hooks 213 or 208 from locking engagement with the pivoted frame 190. The latter is then adapted to be moved up or down as the case may be.

Feeding of detail strip

The pivoted supporting plate 190 carries a fixed rod 221 (Figs. 9 and 15) upon which is mounted a storage roll 222 for the paper 106. Pivoted upon rod 221 between the storage roll and the plate 190 is a three-armed lever 223 for controlling the feeding of the paper. The paper supply roll 224 is frictionally mounted on a rod 225 secured to the lever 223 at its lowest end, as best seen in Fig. 15. The lever 223 supports two separated rollers 226 and 227 and the plate 190 supports three rollers 228, 229 and 230 by which the paper is guided.

The spool on the storage roll 222 has attached thereto a ratchet 231 (Fig. 8) cooperating with a spring pressed pawl 232 pivoted at 233 to the plate 190. The function of the pawl 232 is to hold the spool 222 stationary with respect to the plate 190 during a portion of the time that the three-armed lever 223 is rocked clockwise, thereby causing the paper to wrap around the spool 222. Another pawl 234 is pivoted on the three-armed lever 223 and cooperates with the ratchet 231 to prevent retrograde movement of the storage roll with respect to the lever 223.

For rocking the arm 223, a bell crank 235 is mounted loosely on shaft 32. A rearwardly extending arm on the bell crank is forked to straddle a disk 236 mounted eccentrically on the main driving shaft 31. From the above description it will be apparent that upon each revolution of the shaft 31 and disk 236, the bell crank 235 will rock first rearwardly and then forwardly. By means of a pin 238 on lever 223 cooperating with a slot on bell crank 235, the latter will cause the three-armed lever 223 to rock first in a clockwise and then in a counter-clockwise direction.

The operation of the paper feeding mechanism for the detail strip is as follows:

The paper 106 is paid out of the supply roll 224, passes under roller 226 on the three-armed lever 223, over roller 228, under roller 229, over roller 230, over a writing table 240 fixed to the plate 190, over the roller 227 on the three-armed lever 223, and thence to the storage roll 222. When the three-armed lever moves clockwise, it carries with it the paper 106, moving the latter from writing position to printing position. After the paper has moved part of the distance the pawl 232 engages one of the teeth on the ratchet wheel 231 thereby holding the storage roll 222 stationary with respect to the frame 190 and permitting the strip 106 to wrap partially around the storage roll and at the same time to pull the paper from the supply roll 224. This operation takes place during the down stroke of the amount keys and during the first half of the revolution of the shaft 31. On the up stroke of the operating keys, the three-armed lever 223 is moved counter-clockwise, thereby moving the paper beyond its previous writing position. On the return stroke the spool 222 is forced by the pawl 234 to move with the three-armed lever and take up the slack in the paper. Thus, it is seen that most of the work in feeding the paper is done during the down stroke of the keys. This feeding arrangement is similar to that described in the Fuller Patent No. 1,742,701, January 7, 1930. At the end of the down stroke of the keys and while the paper 106 is in the printing position, a printing impression will be made in a manner to be described presently. After each printing operation the item just printed will appear in the bottom line (see Fig. 1) and the previously recorded items will have been moved upwardly toward the storage roll.

If desired, the paper 106 may be fed manually by a lever 241 pivoted to the frame 190 at 233 and having at its lower end a pawl 243 pivoted thereto (Fig. 8). A spring 245 tends to hold the two pawls 232 and 243 in engagement with the ratchet wheel 231. The hand operated lever 241 is normally held in the forward position by a spring 247 connected to the frame 190.

The inking ribbon 250 for the detail strip printer is fed back and forth between two spools 251 and 252 rotatable on rods supported by the fixed plates 110 and 111. When the parts are in the position shown in Fig. 9, the ribbon is paid out by the spool 251, passes under the roller 253 connecting the plates 110 and 111, around two rods 254 and 255 supported by the casting 116, over the type wheels, over the rounded edge 120 between the shoulders 121 and 122, and around the roller 256 supported by the plates 110 and 111, to the receiving spool 252. The receiving roller 252 is advanced step by step by a spring pressed pawl cooperating with a ratchet (not shown) on the spool 252, and pivoted on a double-arm lever 258. The latter is pivoted at its center to the fixed plate 111 and at its free end is pivoted to a link 259 which is connected to the bail 183. It will be remembered that the bail 183 rocks first clockwise and then counter-clockwise during each operation of the machine. Rocking of bail 183 is effective to move the pawl 257 up and down for feeding the ribbon. After a predetermined movement of the ribbon from spool 251 to spool 252, a reversing mechanism automatically throws the lower end of pawl 257 clear of the ratchet attached to spool 252 and throws the upper end of the pawl into engagement with a similar ratchet on spool 251. Thereafter the ribbon is fed from spool 252 to 251. The ribbon reversing mechanism forms no part of the present invention, and no further description thereof is deemed necessary.

The platen for striking the paper against the inking ribbon and type wheels is shown in Figs. 8 and 9, and comprises a rubber impression block 260 attached to the upper end of an arm 261 the lower end of which is bent to form a bail having parallel arms 262 and 263 connected by a web 264. The bail is pivoted on a rod 265 supported by the pivoted supporting plate 190. The free ends of the arms 262 and 263 are connected by a rod 267. A spring (not shown) urges the platen arm 261 counter-clockwise and away from the type wheels. For actuating the platen there is provided a hammer 269 pivoted on the shaft 32. The hammer has an edge 270 adapted to strike the rod 267 associated with the platen supporting arm 261, and has an arm 271 held yieldingly in engagement with a cam 272 secured to the main driving shaft 31. A spring (not shown) urges the hammer in a counter-clockwise direction and is much stronger than the spring attached to the platen arm 261.

When the machine is operated, the shaft 31 and cam 272 rotate in a clockwise direction as viewed in Fig. 8. During the first half-revolution, the hammer 269 is forced by the cam 272 in a clockwise direction to tension the spring attached to the hammer and to move the hammer away from the rod 267 associated with the platen. At substantially the end of the down stroke of the operating keys, the shaft 31 has moved one-half revolution and the paper 106 has been moved to the printing position. At this time the arm 271 of the printer hammer drops off an abrupt radial edge on the cam 272 and the spring attached to the hammer causes the edge 270 on the latter to strike the rod 267 on the platen arm 261 with sufficient force to rock the platen arm to print an impression on the paper.

Daily report printer

The daily report printer is disposed at substantially the center of the machine and beneath the cover 92 which normally conceals both the detail strip printer and the daily report printer. The latter is supported by the two parallel frames 15 and 16 (Fig. 3) the front ends of which are bifurcated to engage the shaft 17 pivotally supported by the bar 14 integral with machine base 10. The upper rear ends of the frames 15 and 16 rest against the frame 13 integral with the machine base 10, while the lower rear ends are apertured to receive a shaft 18 which passes through ears integral with framework 13. The supporting frames 15 and 16 are furthermore suitably joined together by means of shafts and further connections which will be referred to hereinafter.

The printing mechanism includes a printing totalizer which comprises a frame 296 (Fig. 4) journalled in the supporting frames 15 and 16 by means of journal pins 297 (Figs. 10 and 11) passing through the frames 15 and 16 and into sockets formed in the totalizer frame. These pins are the pivotal points of the totalizer frame 296 and the frame is adapted to be rocked about these points as a center to bring the totalizer pinions into mesh with the actuating racks 37 at the proper time. The totalizer may be made up of any desired number of numeral elements, but as illustrated comprises a series of seven wheels 300 loosely mounted upon a shaft 302 (Fig. 4) journalled in the totalizer frame 296. The peripheries of these wheels are formed with raised characters so as to effect printing upon a suitable impression material. Each printing wheel 300 has attached thereto a pinion 301 the three lower order ones of which are adapted to mesh with the teeth of the segmental racks 37 hereinbefore referred to.

Totalizer engaging mechanism

In order to mesh the pinions 301 with the segmental racks 37 the following mechanism is provided, reference being had particularly to Figs. 10 and 11. Pivoted to one of the pins 297 and alongside of the frame 15 is a bell crank 303. The upwardly extending arm of the bell crank is slotted to receive the totalizer shaft 302, as seen in Fig. 11. A link 304 is forked at each end to receive pins 304' attached to the supporting frame 15. The link 304 has a curved slot 305 which receives a stud 306 attached to the bell crank 303. When the link is in the position shown in Fig. 11, the totalizer pinions 301 are disengaged from their respective segments 37. When, however, the link 304 is shifted rearwardly a sufficient distance, the curved edges of slot 305 will cam the pin 306 to rock the totalizer elements into mesh with their corresponding segments. During each operation—except when the "paid out" key PO is depressed—the link 304 is shifted first rearwardly, and then forwardly, holding the totalizer elements in mesh with the segments 37 sufficiently long to permit the items to be accumulated in the totalizer.

The totalizer engaging mechanism is controlled by a box cam 308 affixed to the main driving shaft 31 and so proportioned that the totalizer elements are moved into engagement with the segments 37 after the keys have been coupled to each other and are moved out of engagement at the end of the down stroke of the keys. The box cam receives a pin 310 mounted upon a reciprocating bar 311 which moves back and forth during each rotation of the box cam. The reciprocating bar is supported at its front end by a pin 313 mounted on the supporting frame 15 and received within a horizontal slot in the bar, and at its rear end is suspended by a link 315 pivoted to the plate 15.

A lever 316 is pivoted near its center at 317 to the link 304, the angular relation between the lever 316 and link 304 being under control of the "paid out" key PO as will be described. A cam slot 318 near the rear end of the lever 316 receives a pin 320 on the reciprocating bar.

The operation of the totalizer engaging mechanism during a "cash" or "no sale" transaction is as follows:

When one or more of the keys 20 (Fig. 2) are depressed they lift the key coupler 23 which lifts the rack bar 28 to rotate the main driving shaft 31. The box cam 308 (Fig. 11) on the shaft 31 slides the bar 311 rearwardly. The bar 311 acts through the pin 320, lever 316 and pin 317, to pull the link 304 rearwardly. The curved portion of the cam slot 305 in moving rearwardly forces the pin 306 down, thereby rocking the bell crank 303 and the totalizer shaft 296 until the totalizer pinions 301 mesh with their respective segments 37. These pinions remain in mesh until the end of the downstroke of the keys 20, at which time the box cam 308 has completed one-half revolution. At about this time the box cam 308 pushes the bar 311 forwardly to the normal position shown in Fig. 11. The bar 311 thereby rocks the totalizer pinions out of engagement with the segments 37.

*Disengagement of totalizer by paid out key*

It is important that the items of a paid out transaction should not be entered into the totalizer. Accordingly, a throw-out mechanism is provided which prevents the engagement of the totalizer elements with the segments 37 whenever the "paid out" key PO is depressed. Referring to Figs. 5 and 6, the key PO has a pin 325 adapted to ride in a curved slot formed in an arm 326 forming part of a bail 327 pivoted on the rod 17. An arm 328, affixed to the opposite end of the bail 327 carries a pin 329 which rides in a curved slot 330 at the foremost end of the lever 316, as seen in Figs. 10 and 11. As soon as paid out key PO has been partially depressed, the pin 325 attached thereto rocks the bail 327 (Fig. 6) and arm 328 (Figs. 10 and 11) clockwise thereby rocking the lever 316 in a counter-clockwise direction. Due to the pin 320 and slot 318 (Fig. 11) the counter-clockwise rotation of lever 316 causes the link 304 to slide forwardly with respect to the bar 311, so that the rear end of the straight portion of slot 305 engages the pin 306 on the totalizer frame 303. Upon a further depression of the paid out key, together with any selected amount keys, the lever 316 remains in its extreme counter-clockwise position. During the time that the lever is in this position, the bar 311 is moved backwardly and forwardly by the box cam 308 as described previously. The motion of bar 311, however, merely slides the straight portion of the slot 305 backwardly and forwardly along the pin 306 on the totalizer frame, and does not rock the totalizer frame to engage the totalizer elements with the segments 37. Near the end of the upstroke of the paid out and other keys, the bail 327 and lever 318 are rocked back to the normal position indicated in Figs. 10 and 11. It is seen, therefore, that at each paid out operation of the machine the totalizer actuators 37 move in the same manner as for a cash transaction, but the totalizer pinions 301 are held out of mesh with respect to the actuators. Records of paid out transactions are printed upon checks in the same manner as in the case of a cash transaction, and it is customary in this type of machine for the clerk to keep the paid out checks in the cash drawer for record purposes.

*Date printing wheels and associated setting devices*

It is desirable that when the total amount of the sales and other information is printed upon the daily report sheet some means be provided to designate the date to which the information pertains or in some cases to show the end of some arbitrary period to which it relates. For this reason the present register includes a series of date setting devices in the form of adjustable wheels 333 which project through an aperture formed in the cabinet 19 and which are normally protected against improper manipulation by the hinged cover 92 previously referred to. The date setting wheels 333, which are adjustable to set up the days as well as the names of the months, are loosely mounted upon a shaft 334 which is fastened at its extreme ends to the intermediate frames 15 and 16. Each wheel 333 has integral therewith a pinion adapted to mesh with the teeth of a cooperating pinion 335 (Fig. 3) which is loosely mounted upon a stub-shaft attached to the side frame 16. The intermediate pinions 335 similarly mesh with pinions of printing wheels 336 which are loosely mounted upon a shaft 337 passing between the intermediate frames 15 and 16. The date printing wheels 336 are provided with raised type so that they may be utilized to effect printing upon the record material. By means of the setting wheels 333, the date printing wheels 336 may be adjusted to print the desired date upon the record bearing material when the daily report printer is operated.

*Special counters*

The daily report printer is provided with four special counters for counting the number of customers, "no sale" transactions, "paid out" transactions, and resetting operations, respectively. The special counters are of the multiple pawl deep-notch transfer type, well known in the art and described in many patents, for example, in Carney, No. 876,295, dated January 7, 1908. The consecutive numbering counters are all mounted in one line on the shaft 337 which, it will be remembered, also supports the date printing wheels.

The "customer" counter, which is situated between the "no sale" and "reset" counters, comprises four wheels 339 (Figs. 3 and 6), the peripheries of which are formed with raised printing characters and these wheels have attached thereto ratchet wheels cooperating with a multi-pronged actuating pawl (not shown) which is pivotally mounted by a pin 341 (Fig. 6) in a bail 342 loosely mounted upon the shaft 337. The multi-prong pawl and ratchet mechanism may be of the type disclosed in applicant's prior patent, No. 1,795,116, dated March 3, 1931. The bail 342 has attached thereto a pin 343 cooperating with a slot 344 formed in a bell crank 345 loosely mounted on a shaft 346 supported by the side frame 15. The lower end of the bell crank 345 is connected by means of a pin and slot connection to a second bell crank 347 loosely mounted upon the shaft 32 and bifurcated at its rearward end to cooperate with an eccentrically mounted disk 350 fast to the main driving shaft 31. From the above it will be evident that when the shaft 31 is rotated by the depression of a key, the bell crank 347 will be rocked and through the cooperating bell crank 345 will rock the bail 342 and thereby insert a unit in the "customer" counter.

The "no sale" counter, which is just to the right of the "customer" counter (Fig. 3), is formed of three wheels 352, the peripheries of which are formed with raised printing characters and these wheels also have attached thereto ratchet wheels cooperating with a multi-prong pawl (similar to the pawl referred to in connection with the "customer" counter). The actuating pawl is carried by a bail 353 (Fig. 3) which has a pin and slot connection with an arm 354 on a bail 355 loosely mounted on the shaft 346. At its left end the bail 355 carries an arm 356, the free end of which is connected by a link 357 (Figs. 5 and 6) to a collar 358 fast to a sleeve 359 loosely mounted on a shaft 360 journalled at its ends in the side frames 11 and 12 of the machine. At its opposite end the sleeve 359 is secured to an arm 361 having a cam slot 362 which receives a stud 363 on the "no sale" key NS. It will be apparent that when the key NS is depressed the stud 363 rocks the arm 361 and sleeve 359 counter-clockwise (as viewed in Fig. 6) thereby rocking the collar 358 in the same direction and causing the link 357 to rock the bail 355 to advance the "no sale" counter wheels 352 one unit.

The "paid out" counter comprises three wheels 364 mounted on the shaft 337 to the right of the "no sale" counter wheels 352. The counter wheels 364 are actuated by a bail 365 similar in construction to the bails 342 and 353. The bail 365, like the other two bails, has a pin and slot connection with an actuating arm, which arm 366 is secured to the shaft 346. The shaft 346 passes through the side frame 15 and, at its left end (Figs. 3 and 6) is secured to an arm 367 connected by a link 368 to a bail 369 loose on the sleeve 359. The bail 369 carries an arm 370 provided with a cam slot to receive a pin 371 on the "paid out" key PO. When the key PO is depressed, the pin 371 rocks the bail 369 to cause the link 368 to rock the arm 367, shaft 346, arm 366 and bail 365, thereby to add a unit to the "paid out" counter wheels 364.

The counter at the left of the "customer" counter (Fig. 3) is known as the "reset" counter, and registers the number of effective resetting operations. A bail 372, which is associated with the reset counter wheels 373, is provided with a laterally extending pin 374 which is in the path of a lug 375 attached to the bail 342 associated with the "customer" counter. The bail 372 has attached thereto a laterally extending pin 376 which cooperates with a resetting lever to rock the bail 372 in an upward and forward direction.

The reset lever 377 is loosely mounted upon the shaft 32 and, as best shown in Figs. 10 and 11, rests on the top edge of a dog 378 pivoted on a stud 379 supported by the side frame 15. As will be described subsequently, the rearward movement of the resetting lever 377 from the normal position shown in Fig. 10 rocks the dog 378 counter-clockwise about the stud 379, thereby elevating the pin 376 to the position indicated in Fig. 11 and moving the bail 372 forwardly. When the bail 372 occupies the forward position the pin 374 (Fig. 3) contacts with the lug 375 on the bail 342 for the "customer" counter. When the bail 372 was moved forwardly a pawl carried thereby merely slipped idly over the ratchet wheels, and it is obvious that the resetting lever could have been operated as many times as desired without disturbing the bail 372 after it had once been adjusted to the forward position.

When the machine is subsequently conditioned for an item entering operation and a key is depressed, the "customer" counter will be operated in the usual manner. Since the bail 372, associated with the "reset" counter, has been forced upwardly and forwardly to bring it in line with the bails 342, 353, and 365, associated with the three remaining counters, the lug 375 contacts with the pin 374 and forces the bail 372 downwardly and rearwardly to its normal position and thereby adds a unit to the "reset" counter. It will be clear, therefore, that the resetting lever merely primes or cocks the counter operating means, and the unit is entered only whenever the machine is subsequently operated.

Adjacent to each of the counters 339, 352, and 364, and loosely mounted upon the shaft 337, is a special printing member 380 which serves to identify its particular counter. The reset counter 373 is provided with a special printing member 381 which is adjustable to two positions whereby to print the letter "G" (see Fig. 16) or the letter "S", depending upon whether the imprint is made when the bail 372 is in its off-normal or normal position, for a purpose described hereinafter. The special printing element 381 is adapted to rock back and forth with the reset bail 372, and to this end is pivoted upon the same shaft 337 and has a rearwardly extending arm 382 (Figs. 10 and 11) which is slotted to receive a reduced portion of the pin 376.

*Daily report sheet printing mechanism*

In cash registers of the class shown and described the total amount of the sales registered and other information is frequently obtainable only by reading the amount standing upon the totalizer elements and other registering devices. It is preferable, however, to have this information printed upon a record bearing material as it then forms a permanent and unchangeable record which may be referred to at any desired time. For this reason the illustrative machine is provided with a simple and effective printing mechanism for printing the desired information on a strip of paper.

In general, the printing mechanism comprises a printing frame which is pivotally mounted and adapted to be manually swung about its pivot by the use of a knob to carry a pair of impression elements against the two lines of printing type already described. The frame is normally spring held in its outward position and is provided with suitable inking devices and means for carrying and guiding a record strip. As already explained the locked cover 92 normally conceals and prevents access to the printing mechanism.

The construction of the various elements of the printer will now be described generally, but not in detail since it forms no part of the present invention. However, for details of construction and further explanation, reference may be had to applicant's above-mentioned Patent No. 1,873,760.

Referring to Fig. 10, the printing frame comprises a plate 383 integral with which are two side plates 384 (Figs. 3 and 10) the lower ends of which are apertured to receive the shaft 17 on the associated devices for effecting printing and carried by the frame just referred to. Journalled in the side plates 384 at their upper portions is a shaft 386 forming the pivotal point of a platen 387 provided with two parallel rubber impression blocks 388. The ribbon supporting frame comprises two parallel plates 389 and 390 which may be attached to each other by any suitable means. The supporting plates 389 and 390 are suitably bent so as to form channels 391 just in line with the impression blocks 388 for the reception of ribbon-carrying frames or plates in which are held or fixed strips of inking ribbon. A ribbon frame is provided for each printing line so that each can be removed or replaced independently of the other.

The ribbon supporting plate 390 extends downwardly and is curved. Also extending between the side plates 384, and curved similarly to the lower portion of the plate 390 to form a narrow passage therewith, is a curved plate 393 (see also Fig. 3) which serves as a support for the roll of paper. The paper strip is drawn from a roll 394 and one end is inserted between the plates 390 and 393 and guided over the rear faces of the rubber impression blocks 388, after which it is guided over the upper curved portion 395 of plate 390 so that it passes forwardly under a plate 396 which is riveted or otherwise secured to the side plate 384 and formed at its upper forward edge with serrations 397 adapted to facilitate tearing of a section of the record strip from the rest of the roll. In order to retain the printer in its forward or normal position, the frame 383 is placed under tension by a spring or other suitable resilient means (not shown).

In order to permit the printing mechanism to be forced rearwardly so as to take a printing impression from the adjusted type carriers, there is provided a button 400 which is slidably mounted in a cover 401 and has its rearward portion contacting with the plate 383.

Let it be assumed that the cover 92 has been raised to permit access to the printing devices and that the record strip supply roll 394 has been properly inserted, and that the ribbon frames are also in their proper positions. If the printing button 400 is now depressed, it will force the entire printing frame rearwardly, thereby causing the lower impression block 388 to contact with the associated totalizer elements and hold the lower portion of the platen rigidly. The platen is then forced to rock slightly counterclockwise so as to permit the upper impression block 388 to stripe the special counter printing element with the result that the printing elements of the two printing lines are struck with substantially equal force. It will be understood that the rubber impression blocks will force the paper against the inking ribbon and against its type so that an impression will be made upon the strip of paper.

After the impression has been made, the upper end of the paper may be grasped by the fingers of the operator and a portion of the printed record strip may be withdrawn and detached from the rest of the roll.

Referring now particularly to Fig. 16, there will be seen an example of printing adapted to be performed by the "daily report" printer. The upper line represents the total amount of the cash sales for some arbitrary period, and parallel to this line is printed the information which is contained upon the special counters and date printing wheels. The letter "G" in the lower line is printed by the special printing member 381 and indicates that the reset lever 377 was displaced from its normal position just before a printing impression was made. As will be pointed out hereinafter, an imprint made after the reset lever has been so displaced, must be followed by a resetting operation before the machine can again be operated by the depression of the keys. The total which is followed by a clearing operation is known as a "grand total", as distinguished from a "subtotal" which is represented by the printed letter "S", and which cannot be followed immediately by a resetting operation. The abbreviations "cust", "NS" and "PO" identify the "customer", "no sale" and "paid out" counters, respectively.

*Control lever*

In the type of machine shown in the drawings it is a common expedient to provide means whereby the keys are locked against operation while the cash drawer is exposed and thus the operator is forced to close the cash drawer at the end of each operation so as not to leave the money contained therein exposed between operations of the machine. The purpose of such constructions is also to compel the operator of the machine to make some record or indication before access to the money contained in the drawer may be had. In certain uses of the machines, it is desirable to disable the mechanism just described so as to permit successive operations of the machine during rush hours without closing the cash drawer after each operation. Again, it is desirable at times to lock the operating keys irrespective of the position of the cash drawer so as to prevent tampering by unauthorized persons.

The illustrative machine is provided with mechanisms for accomplishing the objects just stated, but they do not comprise any portion of the present invention and are merely illustrated in part as an incident to explaining certain features of the present invention. They will, therefore, be described here only generally and for further details of construction reference may be had to applicant's above-mentioned Patent No. 1,873,760.

To provide for the functions just stated, the mechanism embodied in the illustrative machine is placed under the control of a single lever located under the hinged cover 92. When the latter is locked, access to the lever cannot be had except by persons having the key for unlocking the cover. The control lever is adapted to be shifted to accomplish any one of the functions above mentioned and it also has another position which conditions the machine for total printing and in combination with other devices permits a resetting operation to be performed.

As best shown in Figs. 3, 10, and 14, the control lever 405 is loosely mounted upon the shaft 32 and is guided in its reciprocating movement by means of the fixed supporting plate 111 (Fig. 3) and a recess 406 formed in a plate 407 riveted to the intermediate frame 15. The control lever 405 projects through a slot 408 (Fig. 14) formed in the cabinet 19 and has adjacent thereto an index plate 409 which carries legends designating the various positions of the control lever.

A suitable spring-pressed detent 410 cooperates with notches 411 (Fig. 10) on the control lever for yieldingly holding the lever in any one of four selected positions of adjustment. Referring to Fig. 14, when the control lever 405 is adjusted to its uppermost position, the keys of the register are locked against operation. In its next highest position, the control lever conditions the machine for operation by the keys irrespective of whether the cash drawer happens to be open or closed. In the position shown in Fig. 14, the control lever cooperates with the cash drawer to prevent operation of the keys unless the cash drawer is first closed. The mechanism by which the control lever accomplishes the aforementioned function forms no part of the present invention, and no description of such mechanism is deemed necessary. For a description of this mechanism, reference is made to applicant's above-mentioned Patent No. 1,873,760.

The control lever 405 is capable of being moved to still another position, known as the "total" position. When the control lever is brought forward to this position, as shown on the index plate 409 (Fig. 14), a number of functions are performed. These will be taken up in a subsequent section.

*Control lock*

During the description which has previously been given, reference has been made to a hinged cover or hood 92 which conceals and covers the various manipulative devices. As has already been indicated, it is desirable to have this cover locked and to this end the machine is provided with two locks either of which may release the cover to render access to the different manipulative devices. Lock 415 and the lock 416 (Figs. 2 and 3) are under control of the store manager and of the auditor respectively, each of whom is provided with a different key. Both locks are supported by a bracket 417 mounted on the rear frame 13. The upper portion of each lock projects through the cabinet 19 so as to permit the rotation of the lock by the insertion of a suitable key. The barrel of the manager's lock 415 has attached thereto a cam 418 cooperating with pins 419 and 420 carried by a slidable shaft 421 passing through holes formed in the bracket 417. It will be clear that when the manager's key is inserted and turned in lock 415, the cam 418 cooperating with the pin 420 will shift the shaft 421 to the right, as viewed in Fig. 3. The auditor's lock 416 is provided with a cam 422 cooperating with the pin 419 and a pin 424, both on shaft 42, the cam being of such shape that when the auditor's key is turned in lock 416 the shaft 421 will be shifted to the left. The bracket 417 has a depending arm 425 (Fig. 2) which pivotally supports a lever 426. At its respective ends the lever 426 is apertured to receive studs 427 and 428 formed respectively in the shaft 421 and a parallel shaft 429 which is slidably supported by holes formed in the intermediate frames 15 and 16. By reason of the above described construction, when the shaft 421 is shifted to the left, the shaft 429 will move to the right and vice versa.

In order to guide the shaft 429 in its reciprocating movements and prevent it from rotating in the frames 15 and 16, there is attached to the shaft an arm 430 (Fig. 3) carrying a pin 431 working in an aperture of the side frame 16.

Cooperating with a square notch in the shiftable shaft 429 is a bell crank 432 which is pivoted to a rod 433 attached to the side frame 15. One arm of the bell crank projects through an aperture formed in the frame 16 and projects into a hole formed in a slidable bar 435 guided by a stud 436 attached to the frame 16. The slidable bar 435 is provided with means for unlocking the cover or hood 92 whenever the plate is moved either rearwardly by the manager's lock 415, or forwardly by the auditor's lock 416. The mechanism for unlocking the cover 92 by the slidable bar 435 forms no part of the present invention and for a complete disclosure reference is made to applicant's above-mentioned Patent No. 1,873,-760. Besides unlocking the cover 92, the movement of the bar 435 in either direction away from its normal position is effective to unlock the resetting devices for the check printer and detail strip printer respectively, as will be described hereinafter.

The shiftable shaft 429 is provided with means for unlocking the reset lever 377 whenever the auditor's key is turned in the lock 416, and for unlocking the control lever whenever either the manager's key or auditor's key is turned to the unlocking position. As seen in Fig. 11, the shaft 429 is provided with a notch 437 which lies in the plane of the resetting lever 377 only after the shaft has been moved to the right by the auditor's key. When the notch 437 has been brought into alignment with the resetting lever the latter is unlocked as far as the shaft 429 is concerned but may be locked by other devices to be described subsequently. The resetting lever 377 has a notch 438 which normally receives the shaft 429 and permits the shaft to be moved back and forth. When the resetting lever is moved to an off-normal position, such as the position of Fig. 11, the resetting lever locks the shaft 429 and, therefore, the auditor cannot remove his key from the lock 416 until he has first restored the resetting lever to the normal position.

The control lever 405 is provided with a plurality of notches 439 for the same purpose as the notch 438 in the reset lever. The shaft 429 is unlocked by the control lever 405 whenever the control lever occupies one of the four positions illustrated in Fig. 14. The shaft 429 has two other notches similar to notch 437, one of these notches being aligned with the control lever 405 when the auditor's key is turned in the lock 416 and the other when the manager's key is turned. From the above it will be seen that either the manager or the auditor can unlock the control lever while the unlocking of the reset lever 377 requires the operation of the auditor's lock 416.

*Resetting the counters for the check printer and detail strip printer*

The resetting mechanisms for the consecutive counters in the check printer and detail strip printer respectively are shown best in Fig. 13. It will be remembered that the consecutive counter wheels 180 in the detail strip printer are rotatably mounted on a shaft 124 which shaft is adapted to be rotated by a segment gear 1170 for resetting the consecutive counters. Similarly, the consecutive counter wheels 60 in the check printer are mounted on a shaft 53 which is adapted to be rotated in a clockwise direction (as viewed in Fig. 13) in order to restore the counter elements to zero. Secured to the shaft 53 is a spur gear 440 (Fig. 13) which meshes with a segment 441 pivoted to a side frame 12 at the right end of the machine. The resetting segments 1170 and 441 are so connected by a series of levers and links that the two segments move at the same time, but in opposite directions. Normally, rotation of the segments is prevented by a locking plate 443 pivoted near its center to the end frame 12, the upper end of the locking plate engaging the lower end of the segment 441, thereby preventing downward movement of the latter. Upward movement of the segment 441 is limited by a pin 445 secured to the frame 12. The locking lever 443 is also provided with an arm 446 having detents 447 for engaging the pinions on the date setting wheels 80, whereby the date wheels are normally locked against rotation.

It is desirable that the adjustment of the date setting wheels in the check printer and the resetting of the consecutive counters in both the detail strip printer and check printer be under the control of either the auditor or the store manager who is entrusted with a key for operating a lock 416 or 415. In the illustrative machine, an arrangement is provided whereby when either the lock 415 or the lock 416 is turned, the aforesaid resetting mechanisms are unlocked and simultaneously the date setting wheels 80 are released for rotation. Referring to Figs. 2 and 3, a bell crank 449 is pivoted upon a stud 450 supported by the intermediate frame 16. The upper end of the vertical arm 449 of the bell crank is slotted to receive a pin attached to the sliding bar 435. The forward end of the horizontal bar of the bell crank is similarly slotted to receive a pin on the arm 451 secured to a shaft 452 (Fig. 3). Shaft 452 is in direct alignment with shaft 17, as seen in this figure, and projects through the end frame 12. As seen in Fig. 13, the opposite end of the shaft 452 has secured thereto an arm 453, the free end of which is provided with a pin 454 riding in a symmetrical cam slot 455 provided in the locking lever 443. When the store manager inserts his key into the lock 415 and rotates the latter counter-clockwise, the shaft 421 is shifted to the right thereby shifting the shaft 429 to the left. The latter rocks the bell crank 432 counterclockwise, thereby moving the slidable bar 435 rearwardly. The bell crank 449, which is connected to the slidable bar 435 and the arm 451 on the shaft 452, causes this shaft to rotate counter-clockwise, as viewed in Fig. 13. The shape of the slot 455 in the locking lever 443 is such that whenever the shaft 452 and the arm 453 rotate in either direction away from the normal position the locking lever 443 is rocked counterclockwise to its unlocking position. The rocking of locking lever 443 removes the upper end of the lever out of the path of the resetting segment 441 and simultaneously withdraws the detents 447 from the pinions attached to the date setting wheels 80, thereby unlocking the resetting mechanism common to the check printing counter and detail strip printing counter, and unlocking the date wheels in the check printer. When the auditor turns his key in the lock 416, the shaft 452 is rocked clockwise, as viewed in Fig. 13, thereby rocking the arm 453 upwardly; but the locking lever 443 is rocked counterclockwise just as in the case when the manager's key is turned.

The resetting segments 1170 and 441 are operated by a resetting lever 457 which is pivoted at 458 to the end frame 12 and which has a forward end projecting through a slot formed in the cabinet 19. Cooperating with the resetting lever 457 is a segment 460 pivoted on the frame 12 and slotted to receive a pin 461 on the resetting lever. The segment 460 is provided with teeth 463 engaging a pinion 464 secured to a shaft 465 loosely supported by the end frame 12. Also secured to the shaft 465 is an arm 466 which is connected by a link 467 to the free end of the resetting segment 1170. The resetting segment 1170 is pivotally mounted on a stud 468 which is supported by the frame 110.

The operation of the resetting mechanism for the consecutive counters of the check printer and detail strip printer is as follows:

Assuming that the locking lever 443 (Fig. 13) has been rocked counter-clockwise by the operation of either the manager's or the auditor's key, the resetting lever 457 will be free for operation. When the lever 457 is lifted, the segment 460 is rocked counter-clockwise and by virtue of the link 470 rocks the resetting segment 441 in the same direction. During the upward movement of the resetting lever 457, the shaft 53 is rotated clockwise by the segment 441, thereby restoring to zero the consecutive counters 60 for the check printer. Referring to Fig. 7, the shaft 53 is provided with a series of notches 471, each of which is in alignment with a spring-pressed pawl 472 pivoted on its associated counter element 60. When the shaft 53 is rotated clockwise, the notches 471 pick up the pawls 472, thereby carrying the wheels 60 in a clockwise direction until the shaft 53 has completed one revolution. At the end of the up stroke of the resetting lever 457, the counter elements 60 have all been rotated to the zero position. The counter elements 180 supported by the shaft 124 are provided with pawls cooperating with notches similar to those on shaft 53. During the up stroke of the resetting lever, the shaft 124 in the detail strip printer is rotated in a counter-clockwise direction, which is opposite to the direction of rotation of the shaft 53. Consequently, the pawls on the counter elements 180 slip idly over the notches in shaft 124 which moves counter-clockwise.

During the down stroke of the lever 457, the shaft 53 is rotated counter-clockwise while the shaft 124 is rotated clockwise. As a result, the pawls 472 (Fig. 7) slip idly over the notches 471 in shaft 53, while the pawls on the wheels 180 cooperate with the notches in shaft 124 to restore the counter elements 180 to the zero position. In order to insure a complete stroke of the resetting lever 457, a spring-pressed pawl 475 is pivoted on the end frame 12 and adapted to cooperate with teeth formed in the resetting lever.

To summarize the above operation, the resetting lever restores the counter elements 60 on its up stroke and the resetting counter elements 180 on the down stroke. By virtue of this arrangement the resistance to the movement of the resetting lever 457 is distributed between the up stroke and the down stroke. If the resetting of both sets of counter elements were arranged to be effected simultaneously, the resistance to the lever would be greatest near the end of the resetting stroke when all of the counter elements are being moved from nine to zero. If such were the case, the operator might fail to complete the resetting operation at a time when the resistance to the lever is greatest, in the belief that the lever has reached the end of its stroke.

*Daily report printer—resetting device*

Reverting now to the printing elements shown in Figs. 3, 10, and 11, it is desirable that the various registering elements be turned to zero to prepare them for the separate registration of the sales to be accumulated during a subsequent period. To this end, the resetting lever 377 is provided with a forward extension 477 (Fig. 11) formed with rack teeth meshing with the teeth of a gear 478 loose on a stub shaft 479 secured to the intermediate frame 15. The pinion 478 has attached thereto at one side a larger pinion 480 meshing with a pinion 481 loosely mounted upon the shaft 337 which, it will be recalled, supports the special counter wheels. Also connected to the pinion 478 at its other side, is a bent disk 482 (Fig. 10) which is adapted to cooperate with a spool (not shown) pinned to the shaft 302 which, it will be recalled, supports the totalizer elements. Attached to the spool is a gear 484 (Fig. 11) which is normally out of the plane of the pinion 480 with which it is adapted to mesh at certain times. From the above, it will be evident that when the resetting segment 377 rotates, the gear 478, the pinion 480 and the bent disk 482 will rotate as a unit. The pinion 481 may be provided with any suitable lost motion connection for driving the shaft 337 in the same direction.

As more fully disclosed in applicant's above-mentioned Patent No. 1,873,760, in order to reset the totalizer elements 300 to zero, each is provided with a pivoted pawl which is spring-pressed against the shaft 302 which, in turn, is provided with a series of notches one for each wheel of the totalizer. The resetting pawls are normally out of the path of the associated notches but when the shaft 302 is shifted the notches and pawls are brought into cooperative relation, and when the shaft 302 is turned, the notches will contact with the ends of pawls and pick up the totalizer elements in whatever position they may be standing at the beginning of the movement of the shaft and carry them around with it so that a complete rotation of the shaft in such direction will serve to reset the totalizer elements to zero.

The shaft 337 which carries the special counters is provided with a series of notches similar to those provided for the counter elements in the check printer and detail strip printer. These notches, however, are normally in the plane of the resetting pawls carried by the elements of the "customer", "no sale" and "paid out" counters so that this shaft need not be shifted laterally to reset these counters. The "reset" counter wheels 373 (Fig. 3) are not provided with any resetting pawls or associated notches in the supporting shaft 337 so that when the shaft 337 is rotated, the "reset" counter elements will not be restored to their zero position but will continue to accumulate elements whenever the resetting lever and the operating keys are operated alternately. The foregoing resetting construction forms no part of the present invention and, therefore, need not be described in further detail here, but reference may be had to applicant's Patent No. 1,873,760 for a full disclosure.

Assuming that the lever 377 is unlocked for operation, it will be seen that when the lever is moved rearwardly from the position shown in Fig. 10, the teeth of the segmental rack 477 carried by the lever will rotate the pinion 478 and the bent disk 482 thereby shifting the totalizer shaft 302 to bring the pinion 484 into mesh with the teeth of the pinion 480 a part of which is mutilated to allow for this shift and, furthermore, to bring the resetting pawls and notches into coacting relationship.

During this time, the gear 481 will have been moved counter-clockwise through a period of lost motion as fully shown in applicant's above-mentioned Patent No. 1,873,760. At substantially the time that the teeth of the pinions 480 and 484 are in engagement, the further rearward movement of the resetting lever will, through the train of mechanism described, rotate the shafts 302 and 337 to bring the notches in the respective shafts into cooperation with the pick up pawls carried by the totalizer and the three special counter elements to restore them to their zero position.

After the resetting lever has been forced rearwardly, it is again returned to its normal position which will return the resetting shafts 302 and 337 backwardly to normal without affecting the position of the registering elements.

At the beginning of the return stroke of the resetting lever, there will be a lost motion between pinion 481 and the shaft 337, and towards the end of the return stroke of the lever 378 the shaft 302 will be restored to the normal position. When the resetting lever is at its home position, the parts will again stand in the position shown in Fig. 10.

*Locks and interlocking mechanism*

It is desirable that whenever the control lever 405 is in any position but the "total" position, that the printing mechanism and the resetting lever 377 be locked against operation. Referring to Fig. 10, the side plate 384 of the printer is provided with a locking lug 489 adapted to cooperate with a locking edge 490 of a double arm member 491 attached to a shaft 492 passing through the intermediate frames 15 and 16. At the opposite end of the shaft 492 another locking device (not shown) may be provided for cooperating with the other side plate 384 on the printer 383 but this other locking device is not necessary. From the above, it will be quite clear that if an attempt were made to move the printer by operating the button 400, the printer would normally be stopped by the lug 489 contacting with the locking surface 490 on the double arm lever 491.

In order to lock the resetting lever 377 against operation whenever the control lever 405 is in any position except the "total" position, the following means is employed. The resetting lever 377 has connected thereto by means of a pin 493, a member 494 (Fig. 10), bifurcated at its forward end to form an open ended slot 495 to engage the shaft 492, and in addition is provided with a notch 496 cooperating with a stud 497 carried by the rearward end of the double arm 491. The control lever 405 has also attached thereto a member 498 which is provided with an inclined slot 499 embracing the shaft 492 and in addition, has a portion of its lower edge 500 substantially parallel to the incline of the slot 499. The bevelled edge 500 is adapted to rest on the upper surface of the pin 497 whenever the control lever 405 is in any position other than the "total" position.

From the above, it will be evident that if an attempt be made to move the resetting lever 377 rearwardly from the Fig. 10 position, while the control lever is in the "closed drawer" position, movement of the resetting lever will be prevented by the contacting of the pin 497 with the forward edge of the slot 496. If there is any tendency of the wall of the slot to cam the pin 497 out of the slot 496, it will be frustrated by the contact of the pin 497 against the inclined edge 500. If the control lever 405 is moved to any of the next two rearmost positions, "open drawer" or "lock register", the bevelled edge 500 will still contact with the pin 497 and lock the resetting lever against any rearward movement.

The printing mechanism is unlocked for operation whenever the control lever 405 is moved to the "total" position and just how this is performed will now be described.

As shown in Fig. 10, the member 498 is provided with an extension 501 cooperating with a pin 502 carried by the forward end of the locking element 491. When the control lever 405 is moved to its extreme forward position shown in Fig. 10, the connected member 498 also will be moved forwardly and downwardly due to the incline in the slot 499, so that the projection 501 will force the stud 502 downwardly and thereby rock the locking member 491 in a clockwise direction. This will bring the notch 503 formed in the locking arm 491 to register with the locking lug 489. The printing frame 383 can now be moved rearwardly to effect a printing impression from the totalizer and special counters.

The resetting lever 377 is normally locked against any movement whatsoever, by means under the control of the control lever 405, and is adapted to be locked against more than a slight movement, by mechanism which forms a part of the present invention. The manner in which the control lever disables one of the locking devices to unlock the resetting lever for operation is as follows:

When the extension 501 cooperates with the stud 502 to rock the locking arm 491 clockwise, it forces the pin 497 upwardly out of the slot 496, so, therefore as far as this locking mechanism is concerned, the resetting lever 377 will be unlocked for operation when the control lever is moved to the "total" position.

*Compulsory printing before resetting*

The illustrative machine is provided with a novel arrangement which compels printing of totals by the printing frame 383 before the resetting lever 377 may be moved through a resetting stroke. After the double arm 491 has been moved by the control lever, out of locking relation with respect to the reset lever, the latter is permitted to be moved rearwardly a slight distance. The rearward movement of the lever however is limited, for the time being, by a pin 505 (Figs. 10 and 11) which is carried by the resetting lever and which rests upon the upper surface of the dog 378. The dog 378 is urged in a clockwise direction into engagement with the pin 505 by a spring-pressed pawl 506 pivoted to the inner side of frame 111. A full stroke lever 507 pivoted on the stud 379 is received within a groove cut in the bottom surface of pin 505 and is provided with teeth which are adapted to prevent the return of the resetting lever 377 after it has been moved rearwardly to the Fig. 11 position. As will be described hereinafter, the full stroke lever 507 is moved out of locking relationship with respect to the resetting lever 377 after the resetting lever has been moved rearwardly through a complete stroke.

As seen in Fig. 10, the pin 505 on the resetting lever is normally in engagement with the inclined surface 508 on the dog 378 and adjacent to the fulcrum 379. As the resetting lever is pushed rearwardly, the pin 505 rides along the inclined surface 508, forcing the dog 378 downwardly, until the lever 377 is stopped by the engagement of the pin 505 with the walls of a notch 509 on the upper surface of the dog 378. When the resetting lever has reached this position, as illustrated in Fig. 11, the resetting lever 377 is locked against rearward movement by the notch 509, and against forward movement by the full-stroke lever 507.

As explained in a preceding paragraph, the resetting of the totalizer and special counters is not effected immediately upon rearward movement of the resetting lever, but there is a period of idle motion of the resetting lever before any of the totalizer or counter elements begin to move. The arrangement of the pin 505 and notch 509 is such that the locking of the resetting lever in its intermediate position occurs during this period of idle motion.

During the movement of the resetting lever from the Fig. 10 position to the Fig. 11 position, the upper forward edge of the dog 378 engages the pin 376 thereby rocking the reset counter bail 372 and the special printing element 381 (Fig. 3) upwardly and forwardly. The bail 372 and printing element 381—which move as a unit—are yieldingly locked in this position by a spring pressed pawl 510 (Fig. 12) engaging a notch in the bail 372, and remain in this position until a subsequent transaction is entered in the machine.

*Unlocking the reset lever by grand total printing*

Just before the resetting lever 377 is moved from the Fig. 10 position, it is possible to take as many impressions as desired from the daily report printer by manually depressing the knob 400 and feeding the paper. The totals thus taken are known as "subtotals" and are identified by the letter "S" printed by the printing element 381 (Fig. 3). Upon the partial rearward movement of the resetting lever 377 to the Fig. 11 position, the only change in the setting of the printing type, is the substitution of the type "G" on the printing element 381 for the type "S". An imprint taken at this time is known as a "grand total" because it must immediately precede each resetting operation, which in turn must immediately follow each grand total printing operation, in order to unlock the machine. When the resetting lever 377 is in its intermediate position illustrated in Fig. 11, a grand total imprint may be taken by pushing the knob 400 in the same manner as in the case of a sub-total printing. The movement of the printer serves to unlock the resetting lever by the following mechanism:

An arm 511 is pivoted at its forward end to the printer side plate 384, the function of the arm being to move the dog 378 out of locking relationship with respect to the resetting lever 377 when a grand total is printed. The rearward end of the arm has a curved slot 512 receiving the stud 379. The arm is flanged to provide a shelf 513 (Figs. 3, 10, and 11), the rear edge of which may be bevelled on its upper surface. The shelf 513 is adapted to cooperate with a pin 514 on the dog 378 which pin is in the same vertical plane as the shelf. The cooperation of the pin and the shelf is effective to unlock the reset lever 377, in the following manner:

When the operator forces the knob 400 rearwardly to print a grand total, the side plate 384 of the printer 383 pushes the arm 511 rearwardly. Owing to the curvature of the slot 512 in the arm 511, the shelf 513 moves rearwardly and then upwardly. Assuming that the parts are in the Fig. 11 position, the shelf 513 moves under the pin 514 and lifts the pin to rock the dog 378 counter-clockwise about its pivotal support 379. The dog 378 is provided with a pin 515, which, when the dog 378 is rocked counter-clockwise, engages the upper edge of the full stroke lever 507, pushing the latter downwardly, whereby the subsequent return of the resetting lever to normal position is permitted, as far as the lever 507 is concerned. At the same time, the rear edge of the notch 509 is swung out of the path of the pin 505 to permit the resetting lever 377 to be moved rearwardly, thereby resetting the totalizer and certain special counters of the daily report printer as described previously. In order to hold the dog 378 out of locking relationship with respect to the resetting lever, the rearward and lower edge of the dog is provided with a shoulder 519 which engages under a flange 520 on the pawl 506 after the dog has been rocked downwardly. The flange 520 locks the dog 378 in its downward position until after the resetting lever 377 has been restored to normal, as will be described presently. During the time that dog 378 is locked in its downward position, the full-stroke lever 507 is held disabled by the pin 515.

After the resetting lever 377 has been returned to its normal position the dog 378 remains locked downwardly and the resetting lever may be moved freely back and forth as many times as desired without affecting any other parts of the machine. The dog 378 is subsequently released and permitted to return to normal position, when the control lever 405 is moved from the "total" position (Fig. 14) to some other position. The control lever 405 carries a pin 522, which, when the control lever is in the "total" position is received within a notch 523 in the pawl 506. When the control lever is moved to any other position such as "closed drawer", "open drawer" or "lock register", the pin 522 is carried rearwardly. During its rearward movement, the pin 522 engages the lower rearward edge of the notch 523 camming the pawl 506 downwardly. As a result, the dog 378 is released and is rocked upwardly, first by the full stroke lever 507 and then by the dog 506.

After resetting the totalizer and special counters, the auditor may desire to take another print in order to ascertain whether the respective type wheels have been restored completely to zero. An imprint may be taken in the usual manner, provided the control lever is still—or again—in the "total" position. If the imprint is taken before a subsequent operation of the machine by the keys, the type wheels of the totalizer and the "customer", "no sale" and "paid out" counters will stand at zero, while the "reset" counter will print the same number as in the previous imprint.

It is important that the printer be locked against operation after the counter elements have been partially reset, and before the resetting lever 377 has been restored to normal position. To this end the link 494 (Fig. 10) is provided near its forward end with an upper surface 525 which cooperates with the pin 497 on the locking arm 491 to lock the printer against operation whenever the resetting lever 377 is moved rearwardly beyond the Fig. 11 position and until the resetting lever has been restored completely to normal position. The upper surface 525 is cut away adjacent to the notch 496 to permit the resetting lever to be moved slightly to the Fig. 11 position without locking the printer. When the resetting lever moves rearwardly beyond that position, the upper surface 525 of link 494 cams the pin 497 upwardly thereby rocking the locking lever 491 clockwise into the path of the locking lug 489 on the printer frame. On the return stroke of the resetting lever 377, and as the lever nears its home position, the forward lower edge of the link 494 contacts the pin 502 and rocks the locking lever 491 back to the Fig. 10 position.

*Interlocking mechanism between printer and operating keys*

As premised hereinbefore, movement of the control lever to the "total" position will permit the printing of the totals and other information. While the mechanism, as thus far described, is substantially complete and practically operative, it is highly desirable to include other devices which may be called precautionary devices so as to prevent any possible misoperations of the machine. To this end it is desirable while printing is being performed that the operating keys be locked as long as the printer is in the printing position and it is, furthermore, necessary in order to prevent fraudulent printing operations, to prevent printing during the registering operation by the operating keys.

As stated before, the arrangement for locking the keys when the control lever is in the total position, is not a part of the present invention and is clearly disclosed in applicant's Patent No. 1,873,760 previously mentioned.

While a printing operation is being performed, it is apparent that as the printer is moved rearwardly from the position shown in Fig. 10, the engagement of the lug 489 with the slot 503 will serve to hold the locking member 491 rigid and, if an attempt is made to move the control lever out of the "total" position, the lever will be blocked by a bevel-edge 528 formed on the underside of the member 498 engaging the stud 497. Since the control lever 405 is thus locked against any movement, it will, of course, be impossible to move it out of "total" position to unlock the operating keys so long as the printer is displaced from normal position.

*Interlock between resetting lever and operating keys*

The illustrative embodiment includes an interlocking mechanism which prevents the operation of the keys when the resetting lever 377 is in an off-normal position, and conversely locks the resetting lever whenever any of the keys are displaced from their normal position. Referring to Figs. 10 and 11, the main driving shaft 31 carries a disk 530 provided with an arcuate notch 531 concentric with the shaft 32 upon which the resetting lever 377 is pivoted. The resetting lever is provided with a rearward projection 532 whose edges are defined by two arcs, one being normally concentric with the disk 530, and the other being concentric with the shaft 32. When the resetting lever is moved to an off-normal position—for example, the position shown in Fig. 11—the projection 532 enters the notch 531, thereby locking the shaft 31 and consequently the operating keys until the resetting lever has been restored to normal, and until other locking devices hereinbefore described have been disabled. Conversely, if a key has been depressed the shaft 31 and disk 530 are moved causing the notch 531 to move out of the path of the projection 532 and thereby locking the resetting lever.

*General summary of operation*

The nature of the improved mechanism is such that in order to make the foregoing description as clear as possible, it has been necessary to state the operation considerably in detail as an incident to explaining the various features of construction. A complete restatement here of the operation is, therefore, believed to be unnecessary. However, a résumé of the general operation of the machine will now be given to coordinate the operation and functions of the various parts which have been described in detail.

To enter the first cash transaction which it will be assumed amounts to $1.65, the appropriate keys in the dollars, dimes and pennies banks are depressed so that the notches 26 (Fig. 2) in the rear ends of these keys engage the flange 25 of the key coupler 23 and through the main driving shaft 31 and the links 311 and 304 (Fig. 11), the totalizer elements are drawn into engagement with the differentially operated segments 37 (Fig. 4). As the proper keys are depressed, the attached rollers 36 will work in the associated cam slots 35 formed in the plates 34 of the differential frames 33, 42, and 45 related to the three banks. The frames will each be differentially operated so as to move the segments 37 an amount commensurate with the depressed keys. Since the totalizer pinions 301 are drawn into mesh with the actuating segments 37 before the segments have moved, the latter will move the pinions 301 differentially so that the amount $1.65 will be added on the totalizer elements 300. On the return of the keys to normal position, the totalizer pinions will be disengaged from the segments so that the return movement of the latter will not affect the amount registered.

When the differential frames 33, 42, and 45 are moved differentially by the keys, the frames position certain type elements in the check printer and detail strip printer respectively, commensurate with the depressed keys. Referring to the check printer, the item type wheels 54 are actuated by segments 41, 44, and 48 (Fig. 4) which are connected to move with the differential frames 33, 42, and 45 respectively. These type wheels move differentially to adjusted position during the down stroke of the keys, and remain in adjusted position sufficiently long to permit a printing impression to take place. On the up stroke of the keys, the type wheels 54 are restored with the differential frames to normal position. During the down stroke of the keys, the main driving shaft 31 (Fig. 2) operates through the cam 87 and arm 88 to raise the platen supporting arm 84 against the tension of the spring. After the type characters representing the amount ($1.65) have been brought to the printing point, the platen arm 84 is released in a well known manner, and takes an impression from the type wheels 54 upon the check printer.

The check printer includes a consecutive numbering counter 60 (Fig. 4) which adds a unit during each operation of the keys, irrespective of the character of the transaction. The consecutive counter is actuated by a ball 64 which is moved up and down by means of a cam 67 fixed to the main driving shaft 31.

As stated before, the operation of the keys causes a duplicate record of the amount of the transaction to be printed upon a detail strip. The amount wheels 129 (Fig. 4) move together with the corresponding wheels 54 and the check printer, and are adjusted by the differential frames 33, 42, and 45, operating through segments 152, 153, and 154, and a plurality of pinions 162, 163, and 164 connected by concentric sleeves to the type wheels 129. At substantially the same time that a printing impression is made by the check printer, the cam 272 on the main driving shaft 31 has rocked the printing hammer 269 against the tension of a spring, and slips out of the path of the hammer to permit the latter to strike the platen supporting arm 262 which prints from the item type wheels 129 and other type elements upon the detail strip 106. The detail strip printer is provided with a consecutive counter 180 adapted to print numbers corresponding to those printed by the counter 60 in the check printer. The two counters just mentioned are actuated in substantially the same manner. A special type element 127 in the detail strip printer identifies items belonging to "cash" and "paid out" transactions. Normally, the type element 127 presents a star (*) to the printing point, as seen in Fig. 3, for identifying cash transactions. But when the "paid out" key PO is depressed, it rocks a bell crank 177 (Fig. 6) which acts through a link 172, segment 145 and intermediate gear 155 (Figs. 9 and 4) to move the type element 127 so that the symbol P is brought to the printing point. Before an impression is made by the detail strip printer, the detail strip is fed through a predetermined distance from writing position to printing position (see Fig. 15). On the up stroke of the keys the detail strip is fed back to writing position, but through a greater distance, and at the same time the type wheels 129 are returned to normal position.

The daily report printer which is situated substantially in the center of the machine includes, in addition to the totalizer wheels 300, a number of special counters. The customers' counter 339 is advanced one unit during each operation of the machine by means of a cam 350 (Fig. 6) on the main driving shaft 31, bell cranks 347 and 345 and a ball 342. During the first transaction following the resetting of the totalizer 300, the pin 375 (Fig. 3) associated with the customers' counter will cooperate with the extension 374 on the ball 372 associated with the reset counter, which was primed or cocked forwardly on the previous resetting operation, and will thus force the ball 372 rearwardly so as to add a unit in the reset counter. The number then standing on the reset counter will be the special reset number for the sales to be accumulated during the period just begun.

At the termination of a day's business, it is desirable to obtain the available information in printed form and to this end the store manager inserts his key in the lock 415 and rotates the cam 418 counter-clockwise (as seen in Fig. 3), thereby shifting the shaft 421 to the right and shaft 429 to the left. Movement of the shaft 429 to the left is effective to unlock the hood 92, the control lever 405 and the resetting lever 457 for the check printer and detail strip printer, but does not unlock the resetting lever 377 for the daily report printer.

As seen in Fig. 13, the consecutive counters for the check printer and detail strip printer are supported by shafts 53 and 124 respectively. Resetting segments 441 and 117 which are adapted to rotate their respective shafts are connected with each other to move at the same time but in opposite directions. A lock 443 for the resetting segments is rocked counter-clockwise to unlocking position whenever the shaft 429 previously referred to is shifted either to the left or to the right. At the same time, a plurality of teeth 447 on the lock 443 are moved away from the date setting wheels 80, thereby permitting the manager to change the date printed on the checks at substantially the same time that he resets the consecutive counters. To reset the consecutive counters and the check printer and detail strip printer, the manager moves the resetting lever 457 first up and then down. On the up stroke, the shaft 53 rotates clockwise, thereby resetting the counter elements in the check printer to zero, while the shaft 124 rotates counter-clockwise moving idly with respect to its associated counter elements. On the down stroke of lever 457, the shaft 124 is rotated clockwise, thereby restoring to zero the consecutive counter elements in the detail strip printer while the shaft 53 is rotated counter-clockwise.

To operate the daily report printer, the manager first moves the control lever 405 to its lowermost position represented by the indicia "sub-total" in Fig. 14. Movement of the control lever to this position locks the key coupler 23 and unlocks the printing frame 383 (Fig. 10) by moving the locking member 491 out of locking relationship with respect to the stud 489 on the printer frame. The printer button 400 is then depressed sharply so as to force the rubber impression blocks rearwardly, thereby forcing the paper against the inking ribbon and adjusted type members. The impression thus obtained is similar generally to the printed record in Fig. 16, but different in that the letter S appears in place of the letter G at the beginning of the lower line. The letter S is printed by the type element 381 (Fig. 3), which stands in its normal position. The total thus taken is referred to as a "sub-total" and can not be followed by a resetting of the totalizer 300 and special counters associated therewith, until certain locking devices have been disabled and a grand total such as illustrated in Fig. 16 is first printed.

When it is desired to print a total which is to indicate the grand total of all the items entering the machine during a particular period after which the totalizer elements and special counters are reset, the lock 416 (Fig. 3) must first be turned by a key in the possession of the auditor. The lock 416 has a cam 422 adapted to shift the shafts 421 and 429 in directions opposite to their movements by the lock 415. When the shaft 429 is shifted to the right by the auditor's key, the resetting lever 377 as well as the control lever 405 is unlocked. The auditor may, if he wishes, print a "sub-total" in the same manner as described hereinbefore, but the printing of the "sub-total" will not release the resetting lever 377. Resetting lever 377 is normally locked in its foremost position, illustrated in Fig. 10, but when the shaft 429 is shifted to the right, the resetting lever is permitted to be moved rearwardly through a slight distance to the position shown in Fig. 11. When the resetting lever is thus moved, the pin 505 carried thereby rides over the upper edge of the dog 378, thereby rocking the dog counter-clockwise until the resetting lever is locked by the engagement of the pin 505 with a vertical edge 509 on the dog. In order to remove the locking edge 509 out of the path of pin 505, it is first necessary to rock the dog 378 still further in a clockwise direction, and this can be accomplished only by the operation of the printer. Inasmuch as the printing operation at this time will unlock the resetting lever 377, it is desirable to identify the print as a grand total. Accordingly, the special type element 381 which carries the symbols S and G is provided with a pin 376 which is adapted to be rocked upwardly and forwardly when the dog 378 is moved from the position shown in Fig. 10 to the Fig. 11 position. The pin 376 is carried by the bail 372 for the reset counter which, at this time, is primed or cocked so that it will add a unit the next time that the machine is operated as described before.

The printer unlocks the resetting lever in the following manner: When the knob 400 is depressed for printing a grand total, the arm 511 pivoted to the printing frame is moved rearwardly, carrying therewith the shelf 513 which moves rearwardly and upwardly, engaging the under surface of a pin 514 on the dog 378 and thereby moving the dog counter-clockwise. The dog is locked in this position, thereby to permit the resetting lever 377 to be moved rearwardly and returned. The shafts supporting the totalizer 300 and special counters 339, 352, and 364 are so connected to the resetting lever that the counter elements will begin their resetting movement after the lever 377 has moved rearwardly beyond the position shown in Fig. 11. While the resetting lever is being moved through its resetting structure, the printer is locked by means of a link 494 pivoted to the resetting lever and having an upper surface near its free end for rocking the printer locking element 491. The printer remains locked until the resetting lever 377 has been moved forwardly to its normal position shown in Fig. 10, at which time the forward and lower end of the link 494 engages pin 502 to rock the locking element 491 out of locking relationship with respect to the printer.

The auditor may, if he wishes, take another imprint after he has reset the totalizer and counters. The imprint taken at that time will show a zero reading for the totalizer and all of the associated counters except the reset counter, which will print the same number that appeared just before the resetting lever 377 was operated.

By means of the above described construction, the auditor can not reset the totalizer until he has first locked the operating keys by the partial movement of the resetting lever, and then printed a total bearing a mark which distinguishes it as a grand total. After having printed a total, the machine remains locked until the totalizer has been completely reset.

While the form of embodiment of the invention herein shown and described is admirably adapted to fulfill the objects primarily stated, it is to be understood that it is not intended to confine the invention to the one form of embodiment herein shown since it may be embodied in various forms all coming within the scope of the claims which follow:

What is claimed is:

1. In a cash register, item entering means, a plurality of counter elements, a resetting device for the counter elements, a manipulative device, a lock for preventing resetting of the counter elements, means requiring two successive manipulative operations to disable the lock, means whereby said resetting device and manipulative device provide the operation of said means, and means cooperable with the reset device during one of said manipulative operations and being effective to lock the item entering means until the resetting device has reset the counter elements and the reset device has been restored to normal position.

2. In a register, a resetting lever having a preliminary idle movement and a resetting movement in the same direction, a lock for arresting the lever after the preliminary movement and before the resetting movement has commenced, manipulative means and means operated by the manipulative means and rendered operable in response to the preliminary movement of the lever, to disable the lock.

3. In a cash register, a lever, an adjustable locking element cooperating therewith for limiting movement of the lever, means responsive to a limited movement of the lever for moving the locking element from one of its adjustable positions to a second position, a manipulative device, and means actuated by said manipulative device for moving the locking element from its second position to a third position for unlocking said lever.

4. In a cash register, a totalizer, a resetting lever therefor, a printing device for taking totals from the totalizer, a lock for limiting movement of the resetting lever to a partially advanced position, and means actuated by the printing device for disabling the lock when the lever has been moved to the said partially advanced position before a printing operation.

5. In a cash register, a totalizer, a clearing device therefor, a counter for counting the operations of the clearing device, an operating means for the counter adapted to be moved by the clearing device, and a special type carrier for designating when a clearing operation should be performed, said type carrier being connected to move in unison with the operating means for the said counter.

6. In a cash register a fixed supporting frame, a plate pivoted to the fixed frame and adapted to be moved in a vertical plane, locking means for holding the plate in its lowermost position, a manipulative member adapted to render the locking means ineffective, a cover pivoted with respect to the fixed frame and adapted to overlie the plate and to engage said manipulative member, and spring means for elevating the manipulative member when the cover is lifted whereby to make the manipulative member more accessible.

7. In a register having a totalizer, a total printing mechanism and a resetting lever, the combination of means actuated by the lever, during a partial movement thereof, to prevent further movement of the lever, and means operated by the printing mechanism to render the preventing means ineffective.

8. In a register, a counter, a resetting device connected thereto, said device having a preliminary movement followed by a further movement in the same direction, means operated by the device for locking said device after it has completed its preliminary movement and before it commences its further movement, a printer adapted to print the amount standing on said counter while the locking means is effective, and means whereby the locking means is disabled by the printer upon operation thereof.

9. In a cash register, a totalizer, means to print therefrom, a resetting device therefor, means operable by said resetting device to lock said resetting device in an off-normal position prior to its resetting of the totalizer, and means for thereafter releasing the resetting device by operation of the printing means.

10. In a cash register, a totalizer; a resetting lever therefor; impression means; a lock for preventing complete operation of the resetting lever; manipulative means; means controlled by the manipulative means and operable when the lever has been partially operated to render the lock effective; and means whereby an operation of the impression means subsequent to the partial operation of the lever renders the lock ineffective.

11. In a machine of the class described, a totalizer; means for entering items on said totalizer; a resetting lever for said totalizer; means operable upon a preliminary movement of said lever, for locking the lever against complete movement; means for locking the item entering means against operation until the lever has been given a complete movement; printing means; means operated by the printing means, after the preliminary movement of the lever, to free the lever for complete movement; a reset counter; normally ineffective actuating means for the counter; and means operated by the lever locking means, when operated by the resetting lever, to render the counter actuating means operable by the item entering means, whereby an actuating of the reset counter results from the sequential operation of the resetting lever, the printing means, and the item entering means.

12. In a machine of the class described, a totalizer item entering means therefor; a reset lever; locking means operated by a preliminary movement of said lever to prevent a complete operation of said lever; a reset counter; normally silent actuating means for said counter; and means whereby the locking means, when operated during preliminary movement of said lever, conditions said actuating means for operation by the item entering means.

13. In a cash register, a lever; a manipulative impression means; locking means settable by the lever during movement thereof to a predetermined position for preventing further movement of the lever; and releasing means operative by the impression means, when the impression means is operated, to move the locking means for the lever to unlocking position.

14. In a machine of the class described, a totalizer; a resetting lever; an impression device; locking means for said lever including a member, moved by the lever during a preliminary movement of the lever, and operable to lock the lever against further operation; normally inoperative locking means release means operable by the impression means; and means on the member cooperable with the release means when the member has been moved by the lever whereby the operation of the impression means, after the preliminary operation of the lever, will cause the lock to be released.

15. In a machine of the class described, a totalizer; a resetting lever therefor; a printing device for printing totals from said totalizer; a lock for said lever rendered effective by an initial movement of said lever in one direction and operative to prevent further movement of said lever in said one direction; and means actuated by the printing device for releasing the lock during a total printing operation following an initial movement of said lever.

16. In a cash register, the combination of a totalizer; a resetting mechanism; a lock cooperating with the resetting mechanism to prevent a resetting operating; a printer including a special type carrier adjustable to designate when a resetting operation should be performed; means cooperable with the locking means for adjusting the type carrier when the lock locks the resetting mechanism; and means, operable when the printer is operated to print from the adjusted type carrier, to release the lock whereby the resetting mechanism can be operated to reset the counter.

17. In a machine of the class described, the combination of a totalizer; impression means associated with said totalizer; a resetting lever operable through a preliminary idle movement and a resetting movement; locking means for said lever including a member moved by the lever during its idle movement to lock the lever against resetting movement; a special type carrier for designating when the lever has been given an idle movement; means, operated by said member when the member is moved by the lever, to set the type carrier to indicate that the lever has been given an idle movement; and means, operable by the impression means when it is operated to print from the set type carrier, to release the lock for the lever so that the lever may be given a resetting movement.

18. In a machine of the class described, a totalizer; a printer for taking impressions therefrom; a manipulative reset device for said totalizer; means, operable by an initial movement of said device, for locking the device against further movement; a special type element controlled by the locking means and shifted to indicate that the lever is locked; and means, requiring an operation of the printer, for disabling said locking means, the print from the special type element indicating that the device has been locked and then released for further movement.

19. In a machine of the class described, the combination of a reset lever; a control lever; an impression device; locking means for said reset lever; means controlled by said control lever for moving the locking means into contact with the reset lever; means whereby the reset lever, during a preliminary movement of the reset lever, moves the locking means to a position to lock the reset lever; and means operable by the impression device and effective, after the locking means has been moved by the reset lever, to shift the locking means to unlock the reset lever.

20. In a machine of the class described, a lever; a lock for said lever, said lever engaging said lock during a preliminary movement of said lever to move the lock to a position to prevent further movement of said lever; a manipulative device; normally ineffective lock releasing means operated by the manipulative device; and means on the lock, moved into the path of the releasing means when the lock is moved by the lever, whereby operation of the releasing means after the lock has been moved by the lever is effective to release the lock to allow further movement of said lever.

21. In a cash register, a totalizer, a resetting lever and a printer for the totalizer, a lock for limiting movement of the lever, means on the lever for setting the lock in effective position, and means operated by the printer, after the lock has been set, for moving the lock to an ineffective position.

CHARLES W. GREEN.